United States Patent
Guedalia et al.

(10) Patent No.: US 9,858,425 B2
(45) Date of Patent: Jan. 2, 2018

(54) METHOD AND APPARATUS FOR INCREMENTALLY SHARING GREATER AMOUNTS OF INFORMATION BETWEEN USER DEVICES

(71) Applicant: QUALCOMM Incorporated, San Diego, CA (US)

(72) Inventors: Isaac David Guedalia, Beit-Shemesh (IL); Sarah Glickfield, St. Louis, MO (US)

(73) Assignee: QUALCOMM Incorporated, San Diego, CA (US)

( * ) Notice: Subject to any disclaimer, the term of this patent is extended or adjusted under 35 U.S.C. 154(b) by 141 days.

(21) Appl. No.: 14/750,452

(22) Filed: Jun. 25, 2015

(65) Prior Publication Data
US 2016/0004871 A1 Jan. 7, 2016

Related U.S. Application Data

(60) Provisional application No. 62/021,565, filed on Jul. 7, 2014.

(51) Int. Cl.
*H04W 4/02* (2009.01)
*H04W 12/02* (2009.01)
*H04L 29/06* (2006.01)
*G06F 21/60* (2013.01)

(52) U.S. Cl.
CPC ............ *G06F 21/60* (2013.01); *H04L 63/105* (2013.01); *H04W 4/023* (2013.01); *H04W 12/02* (2013.01)

(58) Field of Classification Search
CPC .... H04W 12/02; H04W 4/023; H04L 63/105; G06F 21/60
See application file for complete search history.

(56) References Cited

U.S. PATENT DOCUMENTS

| | | | |
|---|---|---|---|
| 7,870,491 B1 * | 1/2011 | Henderson | G06F 9/4446 715/745 |
| 8,566,602 B2 | 10/2013 | Aaron | |
| 2006/0143466 A1 * | 6/2006 | Muller | H04L 63/0428 713/182 |

(Continued)

OTHER PUBLICATIONS

International Search Report and Written Opinion—PCT/US2015/039371—ISA/EPO—Oct. 14, 2015.

(Continued)

*Primary Examiner* — Khang Do
(74) *Attorney, Agent, or Firm* — Muncy, Geissler, Olds & Lowe, P.C.

(57) ABSTRACT

Methods and systems are disclosed for incrementally sharing increasing amounts of information between two or more user devices. An aspect detects a second user device that is proximate a first user device, receives first log data from the second user device, determines whether the first user device and the second user device interacted with each other during a first period of time based on the first log data, assigns a first trust level to the second user device based on the first log data, wherein the second log data is more private than the first log data, determines whether the first user device and the second user device interacted with each other during a second period of time based on the received second log data, and assigns a second trust level to the second user device based on the second log data.

30 Claims, 18 Drawing Sheets

(56) References Cited

U.S. PATENT DOCUMENTS

| | | | |
|---|---|---|---|
| 2008/0133580 A1 | 6/2008 | Wanless et al. | |
| 2008/0146157 A1* | 6/2008 | Aaron | H04M 1/72566 |
| | | | 455/66.1 |
| 2008/0155644 A1* | 6/2008 | Baranov | H04W 12/10 |
| | | | 726/1 |
| 2008/0256098 A1* | 10/2008 | Kim | G06Q 50/01 |
| 2009/0115600 A1* | 5/2009 | Lee | H04L 63/10 |
| | | | 340/539.11 |
| 2010/0228767 A1 | 9/2010 | Slinker et al. | |
| 2011/0261695 A1* | 10/2011 | Zhao | H04W 28/10 |
| | | | 370/232 |
| 2013/0091211 A1 | 4/2013 | Diab et al. | |
| 2013/0198811 A1 | 8/2013 | Yu et al. | |
| 2014/0006970 A1 | 1/2014 | Casey et al. | |
| 2014/0040373 A1* | 2/2014 | Takamatsu | H04L 67/02 |
| | | | 709/204 |
| 2014/0074923 A1* | 3/2014 | Vasudevan | G06F 21/10 |
| | | | 709/204 |
| 2014/0092805 A1* | 4/2014 | van de Ven | H04W 76/02 |
| | | | 370/328 |
| 2014/0181909 A1* | 6/2014 | Birk | H04L 63/105 |
| | | | 726/4 |
| 2014/0189785 A1 | 7/2014 | Castro et al. | |
| 2014/0237570 A1* | 8/2014 | Shishkov | G06F 21/316 |
| | | | 726/7 |
| 2015/0278546 A1* | 10/2015 | Uekubo | G06Q 10/10 |
| | | | 726/28 |

OTHER PUBLICATIONS

Guo B., et al., "From the internet of things to embedded intelligence," 2012, pp. 1-29.

\* cited by examiner

METHOD AND APPARATUS FOR INCREMENTALLY SHARING GREATER AMOUNTS OF INFORMATION BETWEEN USER DEVICES

CROSS-REFERENCE TO RELATED APPLICATIONS

The present Application for patent claims the benefit of U.S. Provisional Application No. 62/021,565, entitled "INCREMENTALLY SHARING GREATER AMOUNTS OF INFORMATION," filed Jul. 7, 2014, assigned to the assignee hereof, and expressly incorporated herein by reference in its entirety.

TECHNICAL FIELD

The disclosure is related to incrementally sharing greater amounts of information.

BACKGROUND

The Internet is a global system of interconnected computers and computer networks that use a standard Internet protocol suite (e.g., the Transmission Control Protocol (TCP) and Internet Protocol (IP)) to communicate with each other. The Internet of Things (IoT) is based on the idea that everyday objects, not just computers and computer networks, can be readable, recognizable, locatable, addressable, and controllable via an IoT communications network (e.g., an ad-hoc system or the Internet).

A number of market trends are driving development of IoT devices. For example, increasing energy costs are driving governments' strategic investments in smart grids and support for future consumption, such as for electric vehicles and public charging stations. Increasing health care costs and aging populations are driving development for remote/connected health care and fitness services. A technological revolution in the home is driving development for new "smart" services, including consolidation by service providers marketing 'N' play (e.g., data, voice, video, security, energy management, etc.) and expanding home networks. Buildings are getting smarter and more convenient as a means to reduce operational costs for enterprise facilities.

There are a number of key applications for the IoT. For example, in the area of smart grids and energy management, utility companies can optimize delivery of energy to homes and businesses while customers can better manage energy usage. In the area of home and building automation, smart homes and buildings can have centralized control over virtually any device or system in the home or office, from appliances to plug-in electric vehicle (PEV) security systems. In the field of asset tracking, enterprises, hospitals, factories, and other large organizations can accurately track the locations of high-value equipment, patients, vehicles, and so on. In the area of health and wellness, doctors can remotely monitor patients' health while people can track the progress of fitness routines.

SUMMARY

The following presents a simplified summary relating to one or more aspects and/or embodiments associated with the mechanisms disclosed herein to incrementally share greater amounts of information between user devices. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein to incrementally share greater amounts of information between two or more user devices in a simplified form to precede the detailed description presented below.

A method for incrementally sharing increasing amounts of information between two or more user devices includes detecting a second user device that is proximate a first user device, receiving first log data having a first privacy level from the second user device, wherein the first log data comprises log data of the second user device over a first period of time, determining whether the first user device and the second user device interacted with each other during the first period of time based on the first log data, assigning a first trust level to the second user device based on the first user device and the second user device having interacted with each other during the first period of time, receiving second log data having a second privacy level from the second user device, wherein the second log data comprises log data of the second user device over a second period of time, and wherein the second privacy level is higher than the first privacy level, determining whether the first user device and the second user device interacted with each other during the second period of time based on the received second log data, and assigning a second trust level to the second user device based on the first user device and the second user device having interacted with each other during the second period of time.

An apparatus for incrementally sharing increasing amounts of information between two or more user devices includes a transceiver configured to detect a second user device that is proximate a first user device, and to receive first log data having a first privacy level from the second user device, wherein the first log data comprises log data of the second user device over a first period of time, and a processor configured to determine whether the first user device and the second user device interacted with each other during the first period of time based on the first log data, and to assign a first trust level to the second user device based on the first user device and the second user device having interacted with each other during the first period of time, wherein the transceiver is further configured to receive second log data having a second privacy level from the second user device, wherein the second log data comprises log data of the second user device over a second period of time, and wherein the second privacy level is higher than the first privacy level, and wherein the processor is further configured to determine whether the first user device and the second user device interacted with each other during the second period of time based on the second log data, and to assign a second trust level to the second user device based on the first user device and the second user device having interacted with each other during the second period of time.

An apparatus for incrementally sharing increasing amounts of information between two or more user devices includes means for detecting a second user device that is proximate a first user device, means for receiving first log data having a first privacy level from the second user device, wherein the first log data comprises log data of the second user device over a first period of time, means for determining whether the first user device and the second user device interacted with each other during the first period of time based on the first log data, means for assigning a first trust level to the second user device based on the first user device and the second user device having interacted with each other during the first period of time, means for receiving second log data having a second privacy level from the second user device, wherein the second log data comprises log data of the second user device over a second period of time, and wherein the second privacy level is higher than the first privacy level, means for determining whether the first user device and the second user device interacted with each other during the second period of time based on the second log data, and means for assigning a second trust level to the second user device based on the first user device and the second user device having interacted with each other during the second period of time.

A non-transitory computer-readable medium for incrementally sharing increasing amounts of information between two or more user devices includes at least one instruction for detecting a second user device that is proximate a first user device, at least one instruction for receiving first log data having a first privacy level from the second user device, wherein the first log data comprises log data of the second user device over a first period of time, at least one instruction for determining whether the first user device and the second user device interacted with each other during the first period of time based on the first log data, at least one instruction for assigning a first trust level to the second user device based on the first user device and the second user device having interacted with each other during the first period of time, at least one instruction for receiving second log data having a second privacy level from the second user device, wherein the second log data comprises log data of the second user device over a second period of time, and wherein the second privacy level is higher than the first privacy level, at least one instruction for determining whether the first user device and the second user device interacted with each other during the second period of time based on the second log data, and at least one instruction for assigning a second trust level to the second user device based on the first user device and the second user device having interacted with each other during the second period of time.

Other objects and advantages associated with the mechanisms disclosed herein to incrementally share greater amounts of information described herein will be apparent to those skilled in the art based on the accompanying drawings and detailed description.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which:

FIG. 2A illustrates an exemplary Internet of Things (IoT) device in accordance with aspects of the disclosure, while

DETAILED DESCRIPTION

Figure 1A:
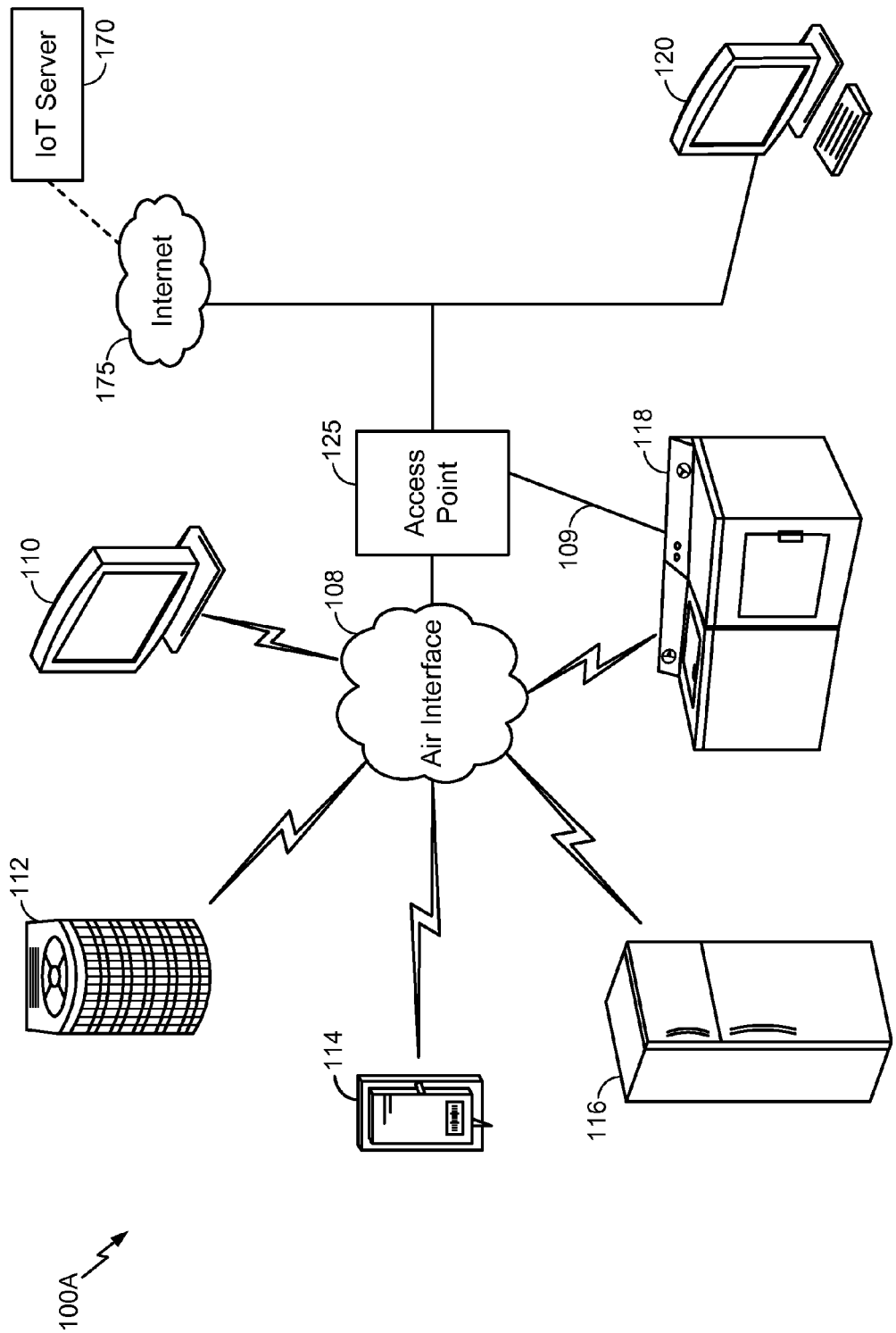
FIG. 1A illustrates a high-level system architecture of a wireless communications system in accordance with an aspect of the disclosure.

The disclosure relates to incrementally sharing increasing amounts of information between two or more user devices. In an embodiment, a first user device detects a second user device that is proximate the first user device and receives first log data having a first privacy level from the second user device, wherein the first log data comprises log data of the second user device over a first period of time. The first user device determines whether the first user device and the second user device interacted with each other during the first period of time based on the first log data, assigns a first trust level to the second user device based on the first user device and the second user device having interacted with each other during the first period of time, and receives second log data having a second privacy level from the second user device. The second log data comprises log data of the second user device over a second period of time, and the second privacy level is higher than the first privacy level. The first user device determines whether the first user device and the second user device interacted with each other during the second period of time based on the received second log data, and assigns a second trust level to the second user device based on the first user device and the second user device having interacted with each other during the second period of time.

These and other aspects are disclosed in the following description and related drawings to show specific examples relating to exemplary embodiments of incrementally sharing greater amounts of information. Alternate embodiments will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects and embodiments disclosed herein.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage or mode of operation.

The terminology used herein describes particular embodiments only and should not be construed to limit any embodiments disclosed herein. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., an application specific integrated circuit (ASIC)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the term "Internet of Things device" (or "IoT device") may refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

FIG. 1A illustrates a high-level system architecture of a wireless communications system 100A in accordance with an aspect of the disclosure. The wireless communications system 100A contains a plurality of IoT devices, which include a television 110, an outdoor air conditioning unit 112, a thermostat 114, a refrigerator 116, and a washer and dryer 118.

Referring to FIG. 1A, IoT devices 110-118 are configured to communicate with an access network (e.g., an access point 125) over a physical communications interface or layer, shown in FIG. 1A as air interface 108 and a direct wired connection 109. The air interface 108 can comply with a wireless Internet protocol (IP), such as IEEE 802.11. Although FIG. 1A illustrates IoT devices 110-118 communicating over the air interface 108 and IoT device 118 communicating over the direct wired connection 109, each IoT device may communicate over a wired or wireless connection, or both.

The Internet 175 includes a number of routing agents and processing agents (not shown in FIG. 1A for the sake of convenience). The Internet 175 is a global system of interconnected computers and computer networks that uses a standard Internet protocol suite (e.g., the Transmission Control Protocol (TCP) and IP) to communicate among disparate devices/networks. TCP/IP provides end-to-end connectivity specifying how data should be formatted, addressed, transmitted, routed and received at the destination.

In FIG. 1A, a computer 120, such as a desktop or personal computer (PC), is shown as connecting to the Internet 175 directly (e.g., over an Ethernet connection or Wi-Fi or 802.11-based network). The computer 120 may have a wired connection to the Internet 175, such as a direct connection to a modem or router, which, in an example, can correspond to the access point 125 itself (e.g., for a Wi-Fi router with both wired and wireless connectivity). Alternatively, rather than being connected to the access point 125 and the Internet 175 over a wired connection, the computer 120 may be connected to the access point 125 over air interface 108 or another wireless interface, and access the Internet 175 over the air interface 108. Although illustrated as a desktop computer, computer 120 may be a laptop computer, a tablet computer, a PDA, a smart phone, or the like. The computer 120 may be an IoT device and/or contain functionality to manage an IoT network/group, such as the network/group of IoT devices 110-118.

The access point 125 may be connected to the Internet 175 via, for example, an optical communication system, such as FiOS, a cable modem, a digital subscriber line (DSL) modem, or the like. The access point 125 may communicate with IoT devices 110-120 and the Internet 175 using the standard Internet protocols (e.g., TCP/IP).

Referring to FIG. 1A, an IoT server 170 is shown as connected to the Internet 175. The IoT server 170 can be implemented as a plurality of structurally separate servers, or alternately may correspond to a single server. In an aspect, the IoT server 170 is optional (as indicated by the dotted line), and the group of IoT devices 110-120 may be a peer-to-peer (P2P) network. In such a case, the IoT devices 110-120 can communicate with each other directly over the air interface 108 and/or the direct wired connection 109. Alternatively, or additionally, some or all of IoT devices 110-120 may be configured with a communication interface independent of air interface 108 and direct wired connection 109. For example, if the air interface 108 corresponds to a Wi-Fi interface, one or more of the IoT devices 110-120 may have Bluetooth or NFC interfaces for communicating directly with each other or other Bluetooth or NFC-enabled devices.

In a peer-to-peer network, service discovery schemes can multicast the presence of nodes, their capabilities, and group membership. The peer-to-peer devices can establish associations and subsequent interactions based on this information.

Figure 1B:
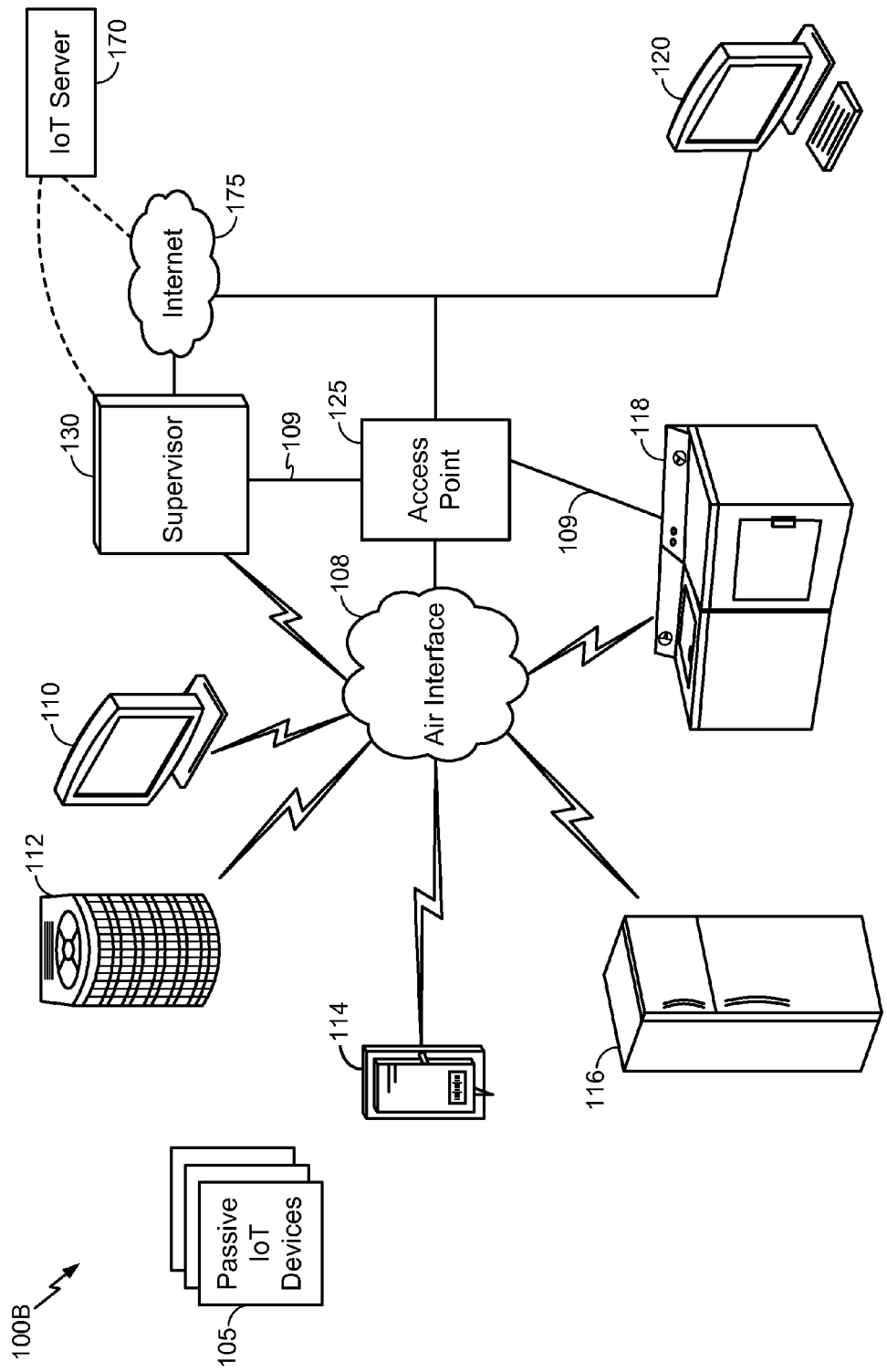
FIG. 1B illustrates a high-level system architecture of a wireless communications system in accordance with another aspect of the disclosure.

In accordance with an aspect of the disclosure, FIG. 1B illustrates a high-level architecture of another wireless communications system 100B that contains a plurality of IoT devices. In general, the wireless communications system 100B shown in FIG. 1B may include various components that are the same and/or substantially similar to the wireless communications system 100A shown in FIG. 1A, which was described in greater detail above (e.g., various IoT devices, including a television 110, outdoor air conditioning unit 112, thermostat 114, refrigerator 116, and washer and dryer 118, that are configured to communicate with an access point 125 over an air interface 108 and/or a direct wired connection 109, a computer 120 that directly connects to the Internet 175 and/or connects to the Internet 175 through access point 125, and an IoT server 170 accessible via the Internet 175, etc.). As such, for brevity and ease of description, various details relating to certain components in the wireless communications system 100B shown in FIG. 1B may be omitted herein to the extent that the same or similar details have already been provided above in relation to the wireless communications system 100A illustrated in FIG. 1A.

Referring to FIG. 1B, the wireless communications system 100B may include a supervisor device 130, which may alternatively be referred to as an IoT manager 130 or IoT manager device 130. As such, where the following description uses the term "supervisor device" 130, those skilled in the art will appreciate that any references to an IoT manager, group owner, or similar terminology may refer to the supervisor device 130 or another physical or logical component that provides the same or substantially similar functionality.

In one embodiment, the supervisor device 130 may generally observe, monitor, control, or otherwise manage the various other components in the wireless communications system 100B. For example, the supervisor device 130 can communicate with an access network (e.g., access point 125) over air interface 108 and/or a direct wired connection 109 to monitor or manage attributes, activities, or other states associated with the various IoT devices 110-120 in the wireless communications system 100B. The supervisor device 130 may have a wired or wireless connection to the Internet 175 and optionally to the IoT server 170 (shown as a dotted line). The supervisor device 130 may obtain information from the Internet 175 and/or the IoT server 170 that can be used to further monitor or manage attributes, activities, or other states associated with the various IoT devices 110-120. The supervisor device 130 may be a standalone device or one of IoT devices 110-120, such as computer 120. The supervisor device 130 may be a physical device or a software application running on a physical device. The supervisor device 130 may include a user interface that can output information relating to the monitored attributes, activities, or other states associated with the IoT devices 110-120 and receive input information to control or otherwise manage the attributes, activities, or other states associated therewith. Accordingly, the supervisor device 130 may generally include various components and support various wired and wireless communication interfaces to observe, monitor, control, or otherwise manage the various components in the wireless communications system 100B.

The wireless communications system 100B shown in FIG. 1B may include one or more passive IoT devices 105 (in contrast to the active IoT devices 110-120) that can be coupled to or otherwise made part of the wireless communications system 100B. In general, the passive IoT devices 105 may include barcoded devices, Bluetooth devices, radio frequency (RF) devices, RFID tagged devices, infrared (IR) devices, NFC tagged devices, or any other suitable device that can provide its identifier and attributes to another device when queried over a short range interface. Active IoT devices may detect, store, communicate, act on, and/or the like, changes in attributes of passive IoT devices.

For example, passive IoT devices 105 may include a coffee cup and a container of orange juice that each have an RFID tag or barcode. A cabinet IoT device and the refrigerator IoT device 116 may each have an appropriate scanner or reader that can read the RFID tag or barcode to detect when the coffee cup and/or the container of orange juice passive IoT devices 105 have been added or removed. In response to the cabinet IoT device detecting the removal of the coffee cup passive IoT device 105 and the refrigerator IoT device 116 detecting the removal of the container of orange juice passive IoT device, the supervisor device 130 may receive one or more signals that relate to the activities detected at the cabinet IoT device and the refrigerator IoT device 116. The supervisor device 130 may then infer that a user is drinking orange juice from the coffee cup and/or likes to drink orange juice from a coffee cup.

Although the foregoing describes the passive IoT devices 105 as having some form of RFID tag or barcode communication interface, the passive IoT devices 105 may include one or more devices or other physical objects that do not have such communication capabilities. For example, certain IoT devices may have appropriate scanner or reader mechanisms that can detect shapes, sizes, colors, and/or other observable features associated with the passive IoT devices 105 to identify the passive IoT devices 105. In this manner, any suitable physical object may communicate its identity and attributes and become part of the wireless communication system 100B and be observed, monitored, controlled, or otherwise managed with the supervisor device 130. Further, passive IoT devices 105 may be coupled to or otherwise made part of the wireless communications system 100A in FIG. 1A and observed, monitored, controlled, or otherwise managed in a substantially similar manner.

Figure 1C:
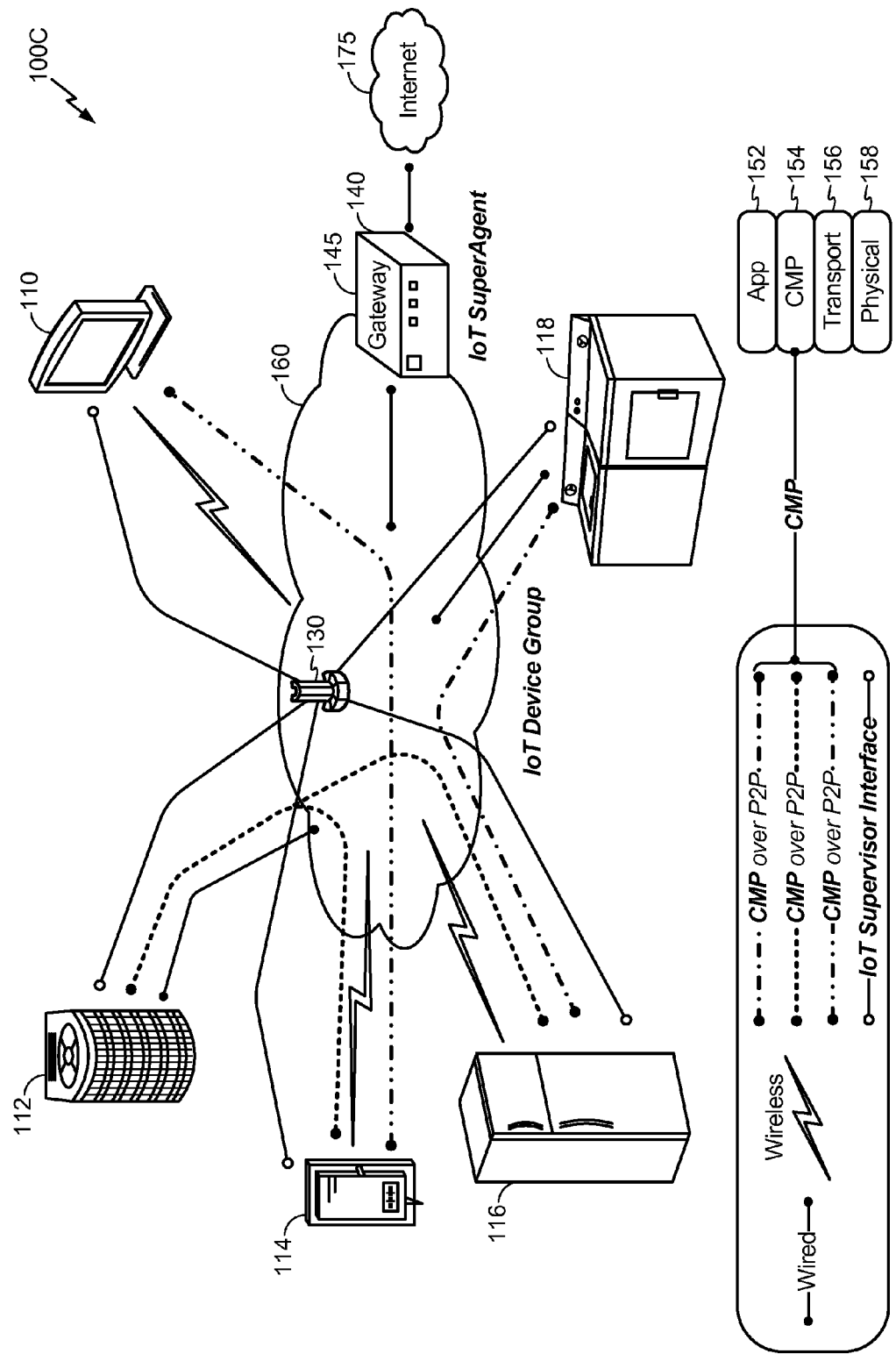
FIG. 1C illustrates a high-level system architecture of a wireless communications system in accordance with an aspect of the disclosure.

In accordance with another aspect of the disclosure, FIG. 1C illustrates a high-level architecture of another wireless communications system 100C that contains a plurality of IoT devices. In general, the wireless communications system 100C shown in FIG. 1C may include various components that are the same and/or substantially similar to the wireless communications systems 100A and 100B shown in FIGS. 1A and 1B, respectively, which were described in greater detail above. As such, for brevity and ease of description, various details relating to certain components in the wireless communications system 100C shown in FIG. 1C may be omitted herein to the extent that the same or similar details have already been provided above in relation to the wireless communications systems 100A and 100B illustrated in FIGS. 1A and 1B, respectively.

The communications system 100C shown in FIG. 1C illustrates exemplary peer-to-peer communications between the IoT devices 110-118 and the supervisor device 130. As shown in FIG. 1C, the supervisor device 130 communicates with each of the IoT devices 110-118 over an IoT supervisor interface. Further, IoT devices 110 and 114, IoT devices 112, 114, and 116, and IoT devices 116 and 118, communicate directly with each other.

The IoT devices 110-118 make up an IoT group 160. An IoT device group 160 is a group of locally connected IoT devices, such as the IoT devices connected to a user's home network. Although not shown, multiple IoT device groups may be connected to and/or communicate with each other via an IoT SuperAgent 140 connected to the Internet 175. At a high level, the supervisor device 130 manages intra-group communications, while the IoT SuperAgent 140 can manage inter-group communications. Although shown as separate devices, the supervisor device 130 and the IoT SuperAgent 140 may be, or reside on, the same device (e.g., a standalone device or an IoT device, such as computer 120 in FIG. 1A). Alternatively, the IoT SuperAgent 140 may correspond to or include the functionality of the access point 125. As yet another alternative, the IoT SuperAgent 140 may correspond to or include the functionality of an IoT server, such as IoT server 170. The IoT SuperAgent 140 may encapsulate gateway functionality 145.

Each IoT device 110-118 can treat the supervisor device 130 as a peer and transmit attribute/schema updates to the supervisor device 130. When an IoT device needs to communicate with another IoT device, it can request the pointer to that IoT device from the supervisor device 130 and then communicate with the target IoT device as a peer. The IoT devices 110-118 communicate with each other over a peer-to-peer communication network using a common messaging protocol (CMP). As long as two IoT devices are CMP-enabled and connected over a common communication transport, they can communicate with each other. In the protocol stack, the CMP layer 154 is below the application layer 152 and above the transport layer 156 and the physical layer 158.

Figure 1D:
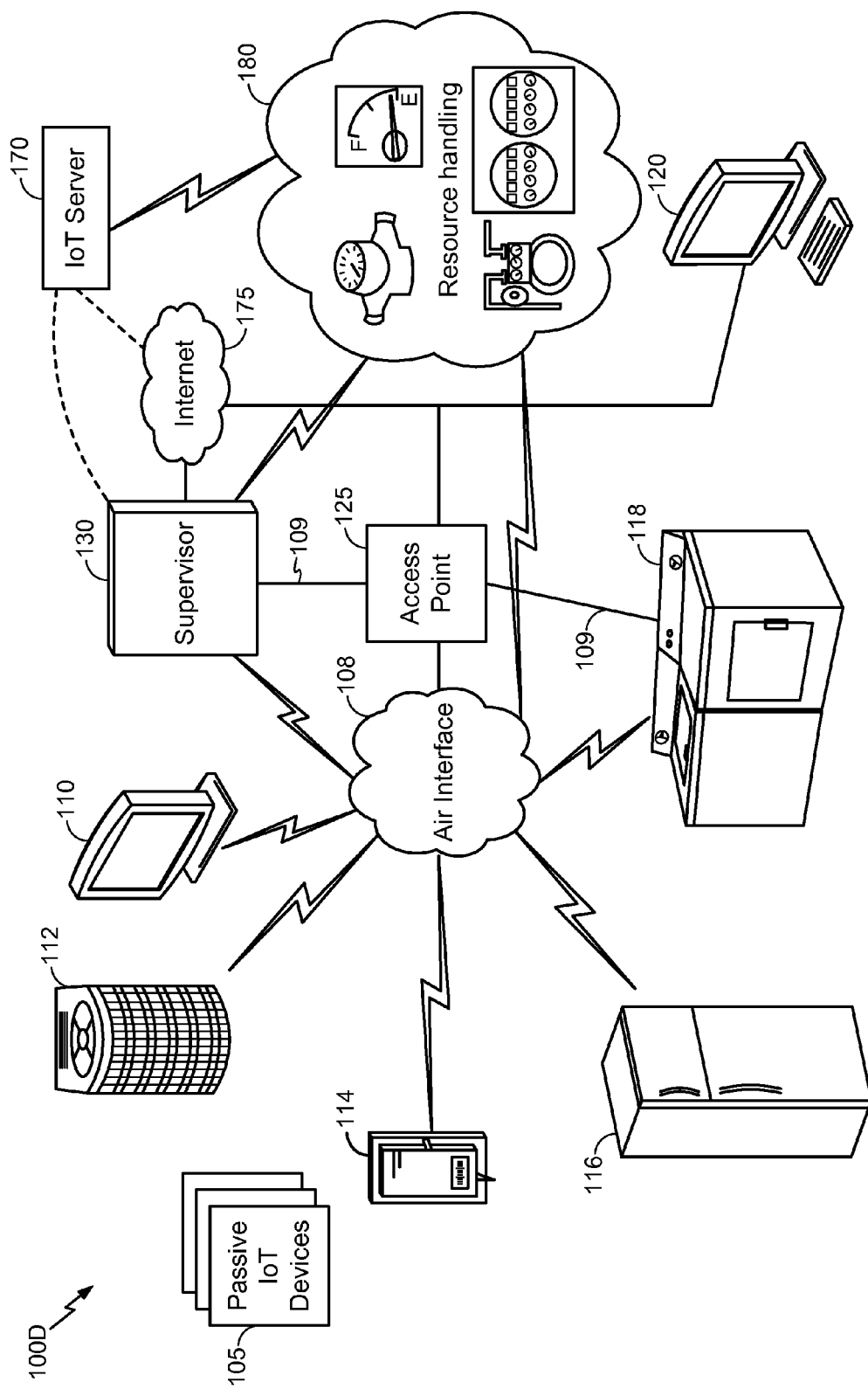
FIG. 1D illustrates a high-level system architecture of a wireless communications system in accordance with an aspect of the disclosure.

In accordance with another aspect of the disclosure, FIG. 1D illustrates a high-level architecture of another wireless communications system 100D that contains a plurality of IoT devices. In general, the wireless communications system 100D shown in FIG. 1D may include various components that are the same and/or substantially similar to the wireless communications systems 100A-C shown in FIG. 1-C, respectively, which were described in greater detail above. As such, for brevity and ease of description, various details relating to certain components in the wireless communications system 100D shown in FIG. 1D may be omitted herein to the extent that the same or similar details have already been provided above in relation to the wireless communications systems 100A-C illustrated in FIGS. 1A-C, respectively.

The Internet 175 is a "resource" that can be regulated using the concept of the IoT. However, the Internet 175 is just one example of a resource that is regulated, and any resource could be regulated using the concept of the IoT. Other resources that can be regulated include, but are not limited to, electricity, gas, storage, security, and the like. An IoT device may be connected to the resource and thereby regulate it, or the resource could be regulated over the Internet 175. FIG. 1D illustrates several resources 180, such as natural gas, gasoline, hot water, and electricity, wherein the resources 180 can be regulated in addition to and/or over the Internet 175.

IoT devices can communicate with each other to regulate their use of a resource 180. For example, IoT devices such as a toaster, a computer, and a hairdryer may communicate with each other over a Bluetooth communication interface to regulate their use of electricity (the resource 180). As another example, IoT devices such as a desktop computer, a telephone, and a tablet computer may communicate over a Wi-Fi communication interface to regulate their access to the Internet 175 (the resource 180). As yet another example, IoT devices such as a stove, a clothes dryer, and a water heater may communicate over a Wi-Fi communication interface to regulate their use of gas. Alternatively, or additionally, each IoT device may be connected to an IoT server, such as IoT server 170, which has logic to regulate their use of the resource 180 based on information received from the IoT devices.

Figure 1E:
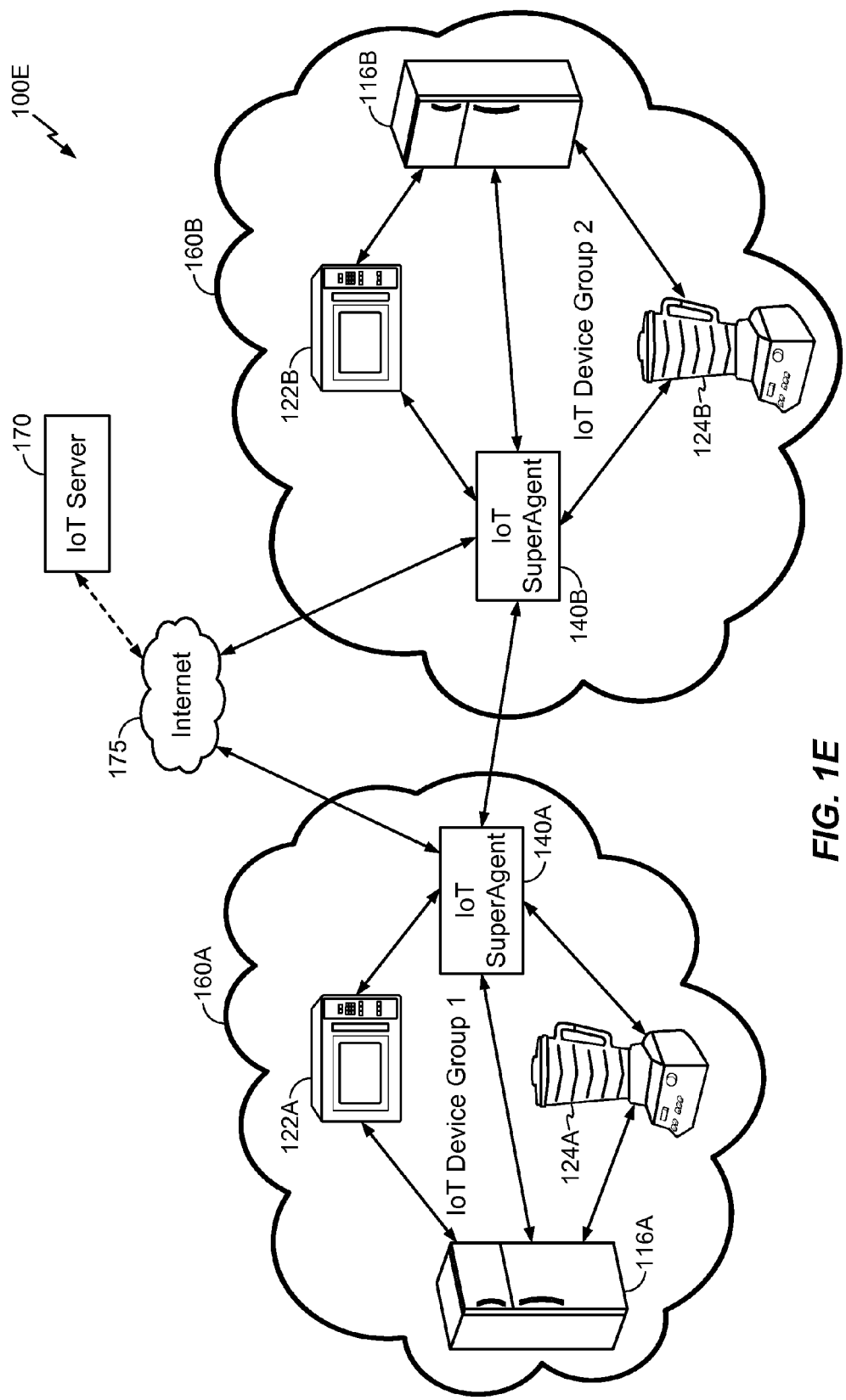
FIG. 1E illustrates a high-level system architecture of a wireless communications system in accordance with an aspect of the disclosure.

In accordance with another aspect of the disclosure, FIG. 1E illustrates a high-level architecture of another wireless communications system 100E that contains a plurality of IoT devices. In general, the wireless communications system 100E shown in FIG. 1E may include various components that are the same and/or substantially similar to the wireless communications systems 100A-D shown in FIG. 1-D, respectively, which were described in greater detail above. As such, for brevity and ease of description, various details relating to certain components in the wireless communications system 100E shown in FIG. 1E may be omitted herein to the extent that the same or similar details have already been provided above in relation to the wireless communications systems 100A-D illustrated in FIGS. 1A-D, respectively.

The communications system 100E includes two IoT device groups 160A and 160B. Multiple IoT device groups may be connected to and/or communicate with each other via an IoT SuperAgent connected to the Internet 175. At a high level, an IoT SuperAgent may manage inter-group communications among IoT device groups. For example, in FIG. 1E, the IoT device group 160A includes IoT devices 116A, 122A, and 124A and an IoT SuperAgent 140A, while IoT device group 160B includes IoT devices 116B, 122B, and 124B and an IoT SuperAgent 140B. As such, the IoT SuperAgents 140A and 140B may connect to the Internet 175 and communicate with each other over the Internet 175 and/or communicate with each other directly to facilitate communication between the IoT device groups 160A and 160B. Furthermore, although FIG. 1E illustrates two IoT device groups 160A and 160B communicating with each other via IoT SuperAgents 140A and 140B, those skilled in the art will appreciate that any number of IoT device groups may suitably communicate with each other using IoT SuperAgents.

Figure 2A:
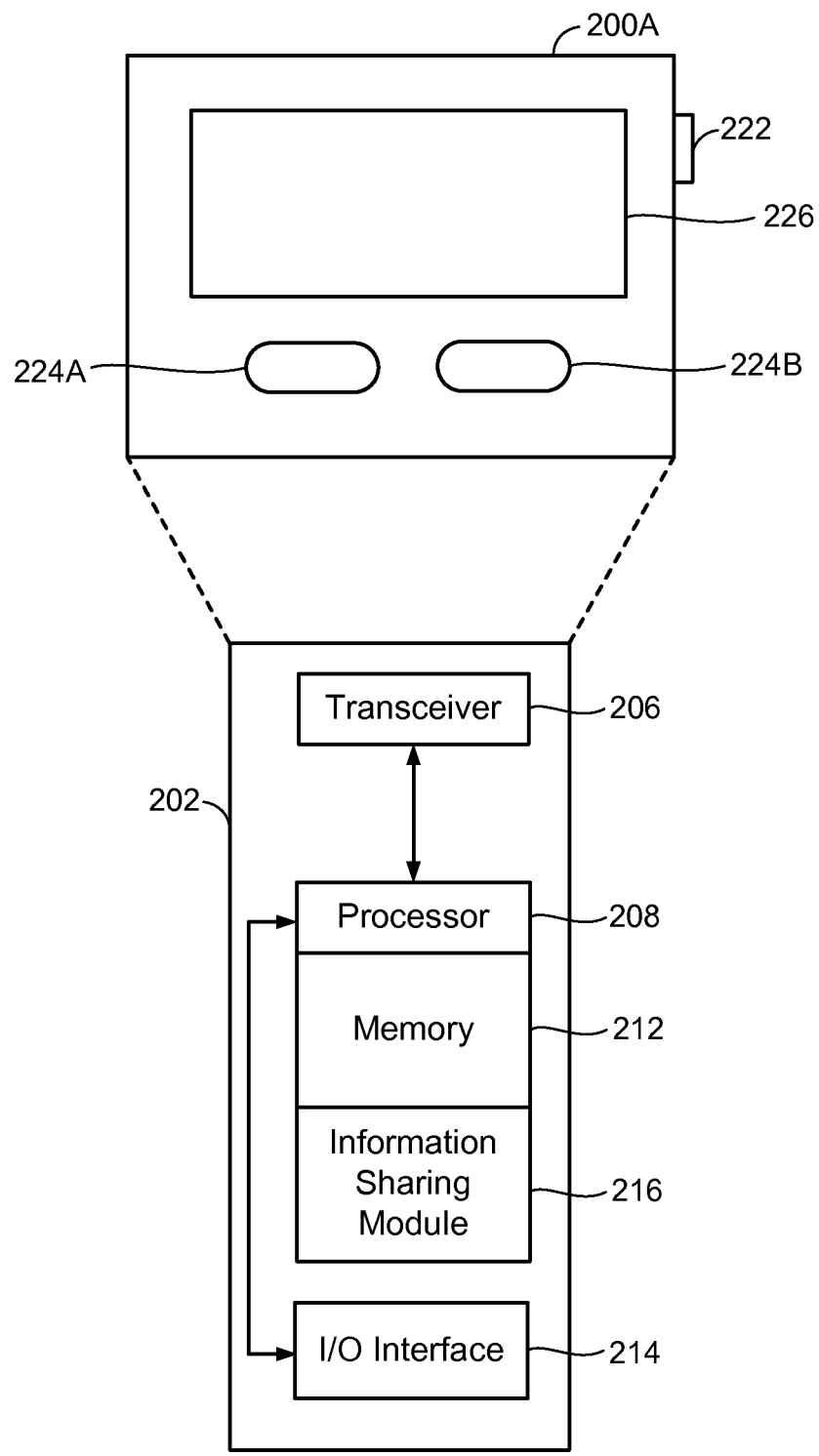

FIG. 2A illustrates a high-level example of an IoT device 200A in accordance with aspects of the disclosure. While external appearances and/or internal components can differ significantly among IoT devices, most IoT devices will have some sort of user interface, which may comprise a display and a means for user input. IoT devices without a user interface can be communicated with remotely over a wired or wireless network, such as air interface 108 in FIGS. 1A-B.

As shown in FIG. 2A, in an example configuration for the IoT device 200A, an external casing of IoT device 200A may be configured with a display 226, a power button 222, and two control buttons 224A and 224B, among other components, as is known in the art. The display 226 may be a touchscreen display, in which case the control buttons 224A and 224B may not be necessary. While not shown explicitly as part of IoT device 200A, the IoT device 200A may include one or more external antennas and/or one or more integrated antennas that are built into the external casing, including but not limited to Wi-Fi antennas, cellular antennas, satellite position system (SPS) antennas (e.g., global positioning system (GPS) antennas), and so on.

While internal components of IoT devices, such as IoT device 200A, can be embodied with different hardware configurations, a basic high-level configuration for internal hardware components is shown as platform 202 in FIG. 2A. The platform 202 can receive and execute software applications, data and/or commands transmitted over a network interface, such as air interface 108 in FIGS. 1A-B and/or a wired interface. The platform 202 can also independently execute locally stored applications. The platform 202 can include one or more transceivers 206 configured for wired and/or wireless communication (e.g., a Wi-Fi transceiver, a Bluetooth transceiver, a cellular transceiver, a satellite transceiver, a GPS or SPS receiver, etc.) operably coupled to one or more processors 208, such as a microcontroller, microprocessor, application specific integrated circuit, digital signal processor (DSP), programmable logic circuit, or other data processing device, which will be generally referred to as processor 208. The processor 208 can execute application programming instructions within a memory 212 of the IoT device. The memory 212 can include one or more of read-only memory (ROM), random-access memory (RAM), electrically erasable programmable ROM (EEPROM), flash cards, or any memory common to computer platforms. One or more input/output (I/O) interfaces 214 can be configured to allow the processor 208 to communicate with and control from various I/O devices such as the display 226, power button 222, control buttons 224A and 224B as illustrated, and any other devices, such as sensors, actuators, relays, valves, switches, and the like associated with the IoT device 200A.

The platform 202 may further include an information sharing module 216 coupled to or incorporated into processor 206. Alternatively, the information sharing module 216 may be a module stored in memory 212 and executable by processor 206. Where the IoT device 200A is configured to incrementally share increasing amounts of information with another user device, as described herein, the information sharing module 216 may be configured to receive first log data having a first privacy level from a proximate second user device, such as another IoT device 200A. The first log data may comprise log data of the second user device over a first period of time. The information sharing module 216 may be further configured to determine whether the IoT device 200A and the second user device interacted with each other during the first period of time based on the first log data, to assign a first trust level to the second user device based on the IoT device 200A and the second user device having interacted with each other during the first period of time, and to receive second log data having a second privacy level from the second user device. The second log data may comprise log data of the second user device over a second period of time, and the second privacy level may be higher than the first privacy level. The information sharing module 216 may be further configured to determine whether the IoT device 200A and the second user device interacted with each other during the second period of time based on the received second log data, and to assign a second trust level to the second user device based on the IoT device 200A and the second user device having interacted with each other during the second period of time, as described further herein.

Accordingly, an aspect of the disclosure can include an IoT device (e.g., IoT device 200A) including the ability to perform the functions described herein. As will be appreciated by those skilled in the art, the various logic elements can be embodied in discrete elements, software modules executed on a processor (e.g., processor 208) or any combination of software and hardware to achieve the functionality disclosed herein. For example, transceiver 206, processor 208, memory 212, information sharing module 216, and I/O interface 214 may all be used cooperatively to load, store and execute the various functions disclosed herein and thus the logic to perform these functions may be distributed over various elements. Alternatively, the functionality could be incorporated into one discrete component. Therefore, the features of the IoT device 200A in FIG. 2A are to be considered merely illustrative and the disclosure is not limited to the illustrated features or arrangement.

Figure 2B:
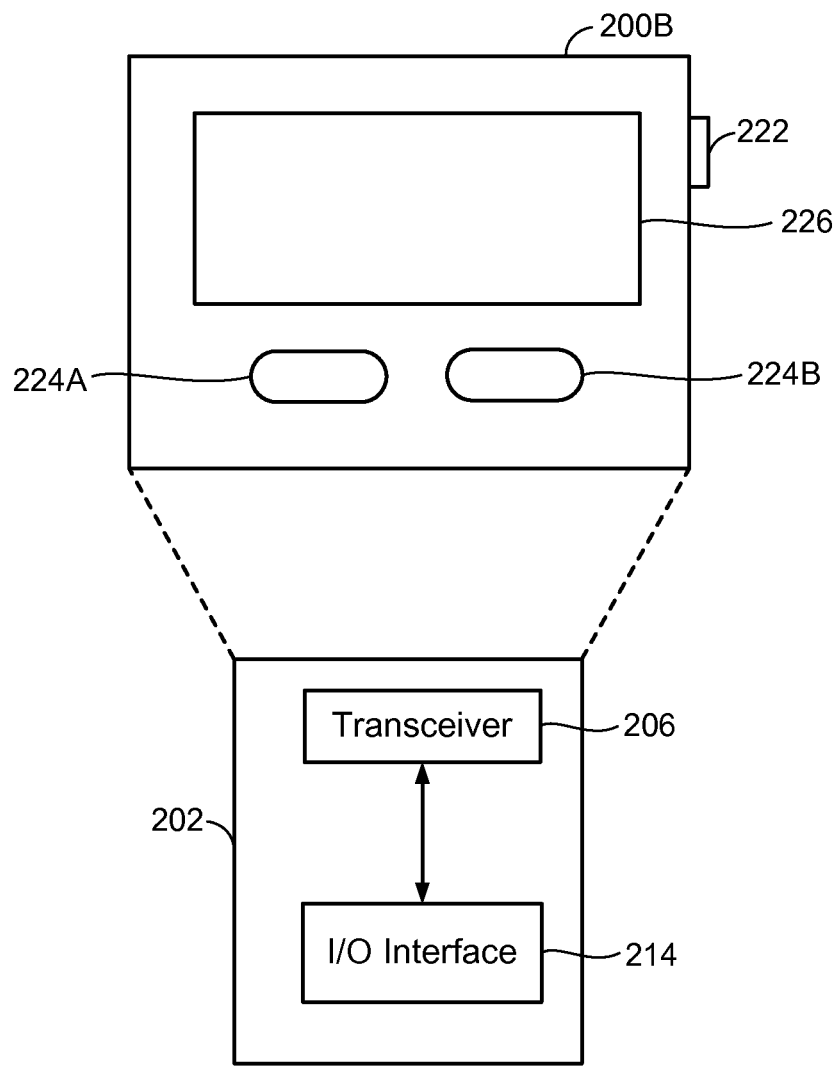
FIG. 2B illustrates an exemplary passive IoT device in accordance with aspects of the disclosure.

FIG. 2B illustrates a high-level example of a passive IoT device 200B in accordance with aspects of the disclosure. In general, the passive IoT device 200B shown in FIG. 2B may include various components that are the same and/or substantially similar to the IoT device 200A shown in FIG. 2A, which was described in greater detail above. As such, for brevity and ease of description, various details relating to certain components in the passive IoT device 200B shown in FIG. 2B may be omitted herein to the extent that the same or similar details have already been provided above in relation to the IoT device 200A illustrated in FIG. 2A.

The passive IoT device 200B shown in FIG. 2B may generally differ from the IoT device 200A shown in FIG. 2A in that the passive IoT device 200B may not have a processor, internal memory, or certain other components. Instead, in one embodiment, the passive IoT device 200B may only include an I/O interface 214 or other suitable mechanism that allows the passive IoT device 200B to be observed, monitored, controlled, managed, or otherwise known within a controlled IoT network. For example, in one embodiment, the I/O interface 214 associated with the passive IoT device 200B may include a barcode, Bluetooth interface, radio frequency (RF) interface, RFID tag, IR interface, NFC interface, or any other suitable I/O interface that can provide an identifier and attributes associated with the passive IoT device 200B to another device when queried over a short range interface (e.g., an active IoT device, such as IoT device 200A, that can detect, store, communicate, act on, or otherwise process information relating to the attributes associated with the passive IoT device 200B).

Although the foregoing describes the passive IoT device 200B as having some form of RF, barcode, or other I/O interface 214, the passive IoT device 200B may comprise a device or other physical object that does not have such an I/O interface 214. For example, certain IoT devices may have appropriate scanner or reader mechanisms that can detect shapes, sizes, colors, and/or other observable features associated with the passive IoT device 200B to identify the passive IoT device 200B. In this manner, any suitable physical object may communicate its identity and attributes and be observed, monitored, controlled, or otherwise managed within a controlled IoT network.

Figure 3:
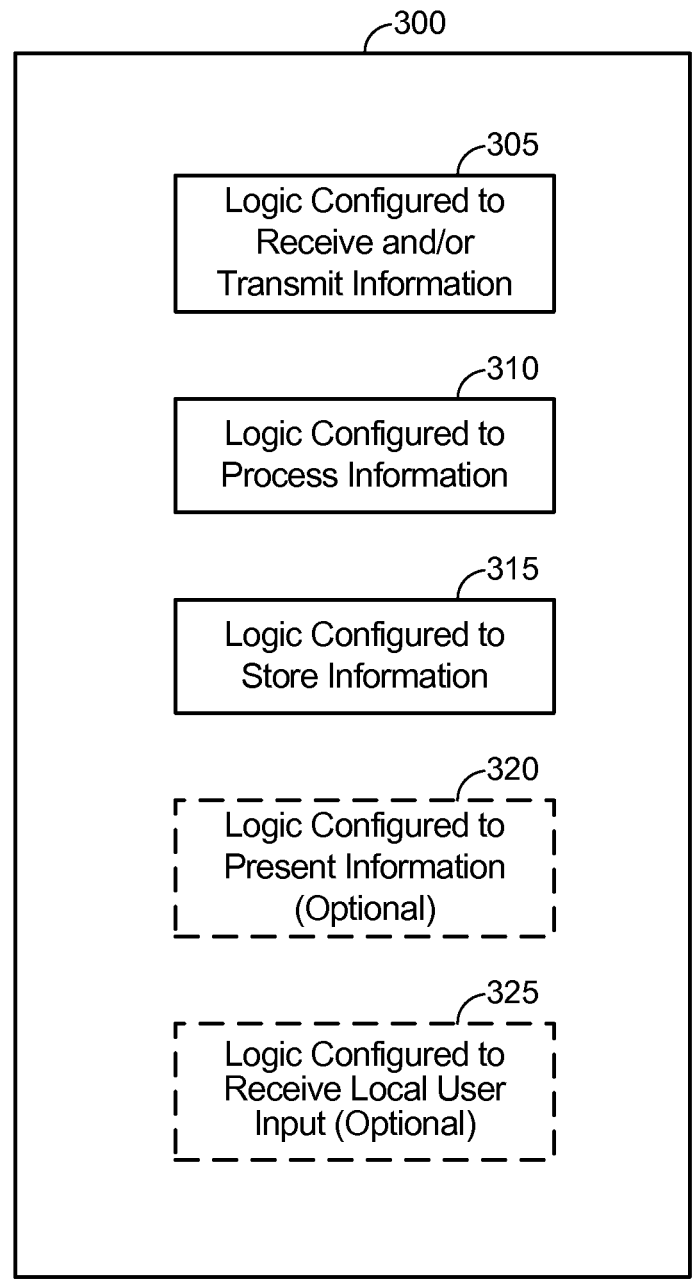
FIG. 3 illustrates a communication device that includes logic configured to perform functionality in accordance with an aspect of the disclosure.

FIG. 3 illustrates a communication device 300 that includes logic configured to perform functionality. The communication device 300 can correspond to any of the above-noted communication devices, including but not limited to IoT devices 110-120, IoT device 200A, any components coupled to the Internet 175 (e.g., the IoT server 170), and so on. Thus, communication device 300 can correspond to any electronic device that is configured to communicate with (or facilitate communication with) one or more other entities over the wireless communications systems 100A-B of FIGS. 1A-B.

Referring to FIG. 3, the communication device 300 includes logic configured to receive and/or transmit information 305. In an example, if the communication device 300 corresponds to a wireless communications device (e.g., IoT device 200A and/or passive IoT device 200B), the logic configured to receive and/or transmit information 305 can include a wireless communications interface (e.g., Bluetooth, Wi-Fi, Wi-Fi Direct, Long-Term Evolution (LTE) Direct, etc.) such as a wireless transceiver and associated hardware (e.g., an RF antenna, a MODEM, a modulator and/or demodulator, etc.). In another example, the logic configured to receive and/or transmit information 305 can correspond to a wired communications interface (e.g., a serial connection, a USB or Firewire connection, an Ethernet connection through which the Internet 175 can be accessed, etc.). Thus, if the communication device 300 corresponds to some type of network-based server (e.g., the application 170), the logic configured to receive and/or transmit information 305 can correspond to an Ethernet card, in an example, that connects the network-based server to other communication entities via an Ethernet protocol. In a further example, the logic configured to receive and/or transmit information 305 can include sensory or measurement hardware by which the communication device 300 can monitor its local environment (e.g., an accelerometer, a temperature sensor, a light sensor, an antenna for monitoring local RF signals, etc.). The logic configured to receive and/or transmit information 305 can also include software that, when executed, permits the associated hardware of the logic configured to receive and/or transmit information 305 to perform its reception and/or transmission function(s). However, the logic configured to receive and/or transmit information 305 does not correspond to software alone, and the logic configured to receive and/or transmit information 305 relies at least in part upon hardware to achieve its functionality.

Referring to FIG. 3, the communication device 300 further includes logic configured to process information 310. In an example, the logic configured to process information 310 can include at least a processor. Example implementations of the type of processing that can be performed by the logic configured to process information 310 includes but is not limited to performing determinations, establishing connections, making selections between different information options, performing evaluations related to data, interacting with sensors coupled to the communication device 300 to perform measurement operations, converting information from one format to another (e.g., between different protocols such as .wmv to .avi, etc.), and so on. For example, the processor included in the logic configured to process information 310 can correspond to a general purpose processor, a DSP, an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration). The logic configured to process information 310 can also include software that, when executed, permits the associated hardware of the logic configured to process information 310 to perform its processing function(s). However, the logic configured to process information 310 does not correspond to software alone, and the logic configured to process information 310 relies at least in part upon hardware to achieve its functionality.

In an embodiment, the logic configured to process information 310 may further include, be coupled to, or execute an information sharing module, such as information sharing module 216, as described herein. Specifically, where the communication device 300 is configured to incrementally share increasing amounts of information with another user device, as described herein, the logic configured to process information 310, in conjunction with the information sharing module, may be configured to receive first log data having a first privacy level from a proximate second user device, such as another communication device 300. The first log data may comprise log data of the second user device over a first period of time. The logic configured to process information 310, in conjunction with the information sharing module, may be further configured to determine whether the communication device 300 and the second user device interacted with each other during the first period of time based on the first log data, to assign a first trust level to the second user device based on the communication device 300 and the second user device having interacted with each other during the first period of time, and to receive second log data having a second privacy level from the second user device. The second log data may comprise log data of the second user device over a second period of time, and the second privacy level may be higher than the first privacy level The logic configured to process information 310, in conjunction with the information sharing module, may be further configured to determine whether the communication device 300 and the second user device interacted with each other during the second period of time based on the received second log data, and to assign a second trust level to the second user device based on the communication device 300 and the second user device having interacted with each other during the second period of time, as described further herein.

Referring to FIG. 3, the communication device 300 further includes logic configured to store information 315. In an example, the logic configured to store information 315 can include at least a non-transitory memory and associated hardware (e.g., a memory controller, etc.). For example, the non-transitory memory included in the logic configured to store information 315 can correspond to RAM, flash memory, ROM, erasable programmable ROM (EPROM), EEPROM, registers, hard disk, a removable disk, a CD-ROM, or any other form of storage medium known in the art. The logic configured to store information 315 can also include software that, when executed, permits the associated hardware of the logic configured to store information 315 to perform its storage function(s). However, the logic configured to store information 315 does not correspond to software alone, and the logic configured to store information 315 relies at least in part upon hardware to achieve its functionality. Further, where the information sharing module is executable by the logic configured to process information 310, the logic configured to store information 315 may store the information sharing module.

Referring to FIG. 3, the communication device 300 further optionally includes logic configured to present information 320. In an example, the logic configured to present information 320 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 300. For example, if the communication device 300 corresponds to the IoT device 200A as shown in FIG. 2A and/or the passive IoT device 200B as shown in FIG. 2B, the logic configured to present information 320 can include the display 226. In a further example, the logic configured to present information 320 can be omitted for certain communication devices, such as network communication devices that do not have a local user (e.g., network switches or routers, remote servers, etc.). The logic configured to present information 320 can also include software that, when executed, permits the associated hardware of the logic configured to present information 320 to perform its presentation function(s). However, the logic configured to present information 320 does not correspond to software alone, and the logic configured to present information 320 relies at least in part upon hardware to achieve its functionality.

Referring to FIG. 3, the communication device 300 further optionally includes logic configured to receive local user input 325. In an example, the logic configured to receive local user input 325 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 300. For example, if the communication device 300 corresponds to the IoT device 200A as shown in FIG. 2A and/or the passive IoT device 200B as shown in FIG. 2B, the logic configured to receive local user input 325 can include the buttons 222, 224A, and 224B, the display 226 (if a touchscreen), etc. In a further example, the logic configured to receive local user input 325 can be omitted for certain communication devices, such as network communication devices that do not have a local user (e.g., network switches or routers, remote servers, etc.). The logic configured to receive local user input 325 can also include software that, when executed, permits the associated hardware of the logic configured to receive local user input 325 to perform its input reception function(s). However, the logic configured to receive local user input 325 does not correspond to software alone, and the logic configured to receive local user input 325 relies at least in part upon hardware to achieve its functionality.

Referring to FIG. 3, while the configured logics of 305 through 325 are shown as separate or distinct blocks in FIG. 3, it will be appreciated that the hardware and/or software by which the respective configured logic performs its functionality can overlap in part. For example, any software used to facilitate the functionality of the configured logics of 305 through 325 can be stored in the non-transitory memory associated with the logic configured to store information 315, such that the configured logics of 305 through 325 each performs their functionality (i.e., in this case, software execution) based in part upon the operation of software stored by the logic configured to store information 315. Likewise, hardware that is directly associated with one of the configured logics can be borrowed or used by other configured logics from time to time. For example, the processor of the logic configured to process information 310 can format data into an appropriate format before being transmitted by the logic configured to receive and/or transmit information 305, such that the logic configured to receive and/or transmit information 305 performs its functionality (i.e., in this case, transmission of data) based in part upon the operation of hardware (i.e., the processor) associated with the logic configured to process information 310.

Generally, unless stated otherwise explicitly, the phrase "logic configured to" as used throughout this disclosure is intended to invoke an aspect that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the aspects described below in more detail.

Figure 4:
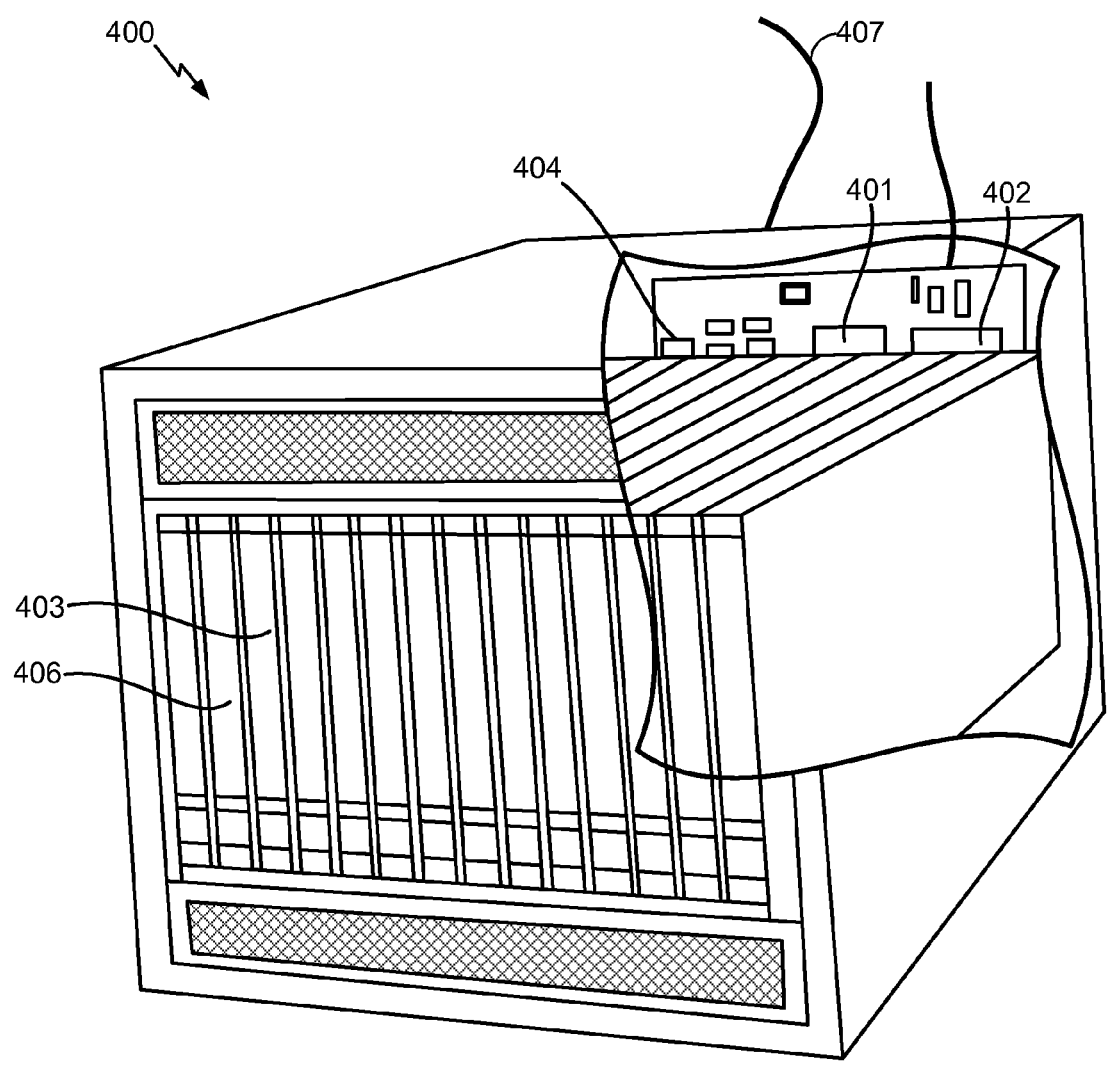
FIG. 4 illustrates an exemplary server according to various aspects of the disclosure.

The various embodiments may be implemented on any of a variety of commercially available server devices, such as server 400 illustrated in FIG. 4. In an example, the server 400 may correspond to one example configuration of the IoT server 170 described above. In FIG. 4, the server 400 includes a processor 401 coupled to volatile memory 402 and a large capacity nonvolatile memory, such as a disk drive 403. The server 400 may also include a floppy disc drive, compact disc (CD) or DVD disc drive 406 coupled to the processor 401. The server 400 may also include network access ports 404 coupled to the processor 401 for establishing data connections with a network 407, such as a local area network coupled to other broadcast system computers and servers or to the Internet. In context with FIG. 3, it will be appreciated that the server 400 of FIG. 4 illustrates one example implementation of the communication device 300, whereby the logic configured to transmit and/or receive information 305 corresponds to the network access points 404 used by the server 400 to communicate with the network 407, the logic configured to process information 310 corresponds to the processor 401, and the logic configuration to store information 315 corresponds to any combination of the volatile memory 402, the disk drive 403 and/or the disc drive 406. The optional logic configured to present information 320 and the optional logic configured to receive local user input 325 are not shown explicitly in FIG. 4 and may or may not be included therein. Thus, FIG. 4 helps to demonstrate that the communication device 300 may be implemented as a server, in addition to an IoT device implementation as in FIG. 2A.

Figure 5:
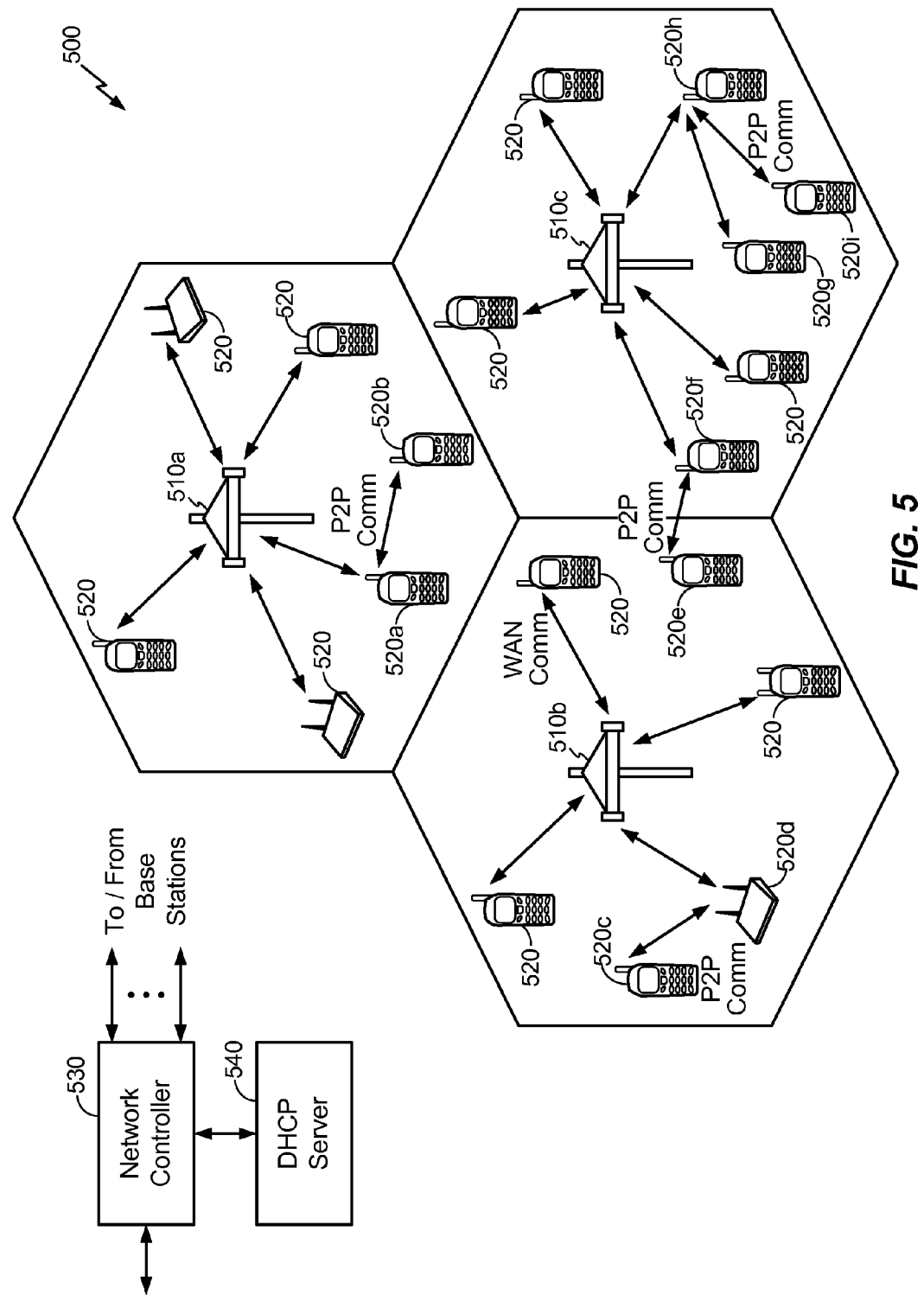
FIG. 5 illustrates a wireless communication network that may support discoverable peer-to-peer (P2P) services, in accordance with one aspect of the disclosure.

In general, user equipment (UE) such as telephones, tablet computers, laptop and desktop computers, certain vehicles, etc., can be configured to connect with each other either locally (e.g., Bluetooth, local Wi-Fi, etc.) or remotely (e.g., via cellular networks, through the Internet, etc.). Furthermore, certain UEs may also support proximity-based peer-to-peer (P2P) communication using certain wireless networking technologies (e.g., Wi-Fi, Bluetooth, Wi-Fi Direct, etc.) that enable devices to make a one-to-one connection or simultaneously connect to a group that includes several devices in order to directly communicate with one another. To that end, FIG. 5 illustrates an exemplary wireless communication network or WAN 500 that may support discoverable P2P services. For example, in one embodiment, the wireless communication network 500 may comprise an LTE network or another suitable WAN that includes various base stations 510 and other network entities. For simplicity, only three base stations 510a, 510b and 510c, one network controller 530, and one Dynamic Host Configuration Protocol (DHCP) server 540 are shown in FIG. 5. A base station 510 may be an entity that communicates with devices 520 and may also be referred to as a Node B, an evolved Node B (eNB), an access point, etc. Each base station 510 may provide communication coverage for a particular geographic area and may support communication for the devices 520 located within the coverage area. To improve network capacity, the overall coverage area of a base station 510 may be partitioned into multiple (e.g., three) smaller areas, wherein each smaller area may be served by a respective base station 510. In 3GPP, the term "cell" can refer to a coverage area of a base station 510 and/or a base station subsystem 510 serving this coverage area, depending on the context in which the term is used. In 3GPP2, the term "sector" or "cell-sector" can refer to a coverage area of a base station 510 and/or a base station subsystem 510 serving this coverage area. For clarity, the 3GPP concept of "cell" may be used in the description herein.

A base station 510 may provide communication coverage for a macro cell, a pico cell, a femto cell, and/or other cell types. A macro cell may cover a relatively large geographic area (e.g., several kilometers in radius) and may allow unrestricted access by devices 520 with service subscription. A pico cell may cover a relatively small geographic area and may allow unrestricted access by devices 520 with service subscription. A femto cell may cover a relatively small geographic area (e.g., a home) and may allow restricted access by devices 520 having association with the femto cell (e.g., devices 520 in a Closed Subscriber Group (CSG)). In the example shown in FIG. 5, wireless network 500 includes macro base stations 510a, 510b and 510c for macro cells. Wireless network 500 may also include pico base stations 510 for pico cells and/or home base stations 510 for femto cells (not shown in FIG. 5).

Network controller 530 may couple to a set of base stations 510 and may provide coordination and control for these base stations 510. Network controller 530 may be a single network entity or a collection of network entities that can communicate with the base stations via a backhaul. The base stations may also communicate with one another, e.g., directly or indirectly via wireless or wireline backhaul. DHCP server 540 may support P2P communication, as described below. DHCP server 540 may be part of wireless network 500, external to wireless network 500, run via Internet Connection Sharing (ICS), or any suitable combination thereof. DHCP server 540 may be a separate entity (e.g., as shown in FIG. 5) or may be part of a base station 510, network controller 530, or some other entity. In any case, DHCP server 540 may be reachable by devices 520 desiring to communicate peer-to-peer.

Devices 520 may be dispersed throughout wireless network 500, and each device 520 may be stationary or mobile. A device 520 may also be referred to as a node, user equipment (UE), a station, a mobile station, a terminal, an access terminal, a subscriber unit, etc. A device 520 may be a cellular phone, a personal digital assistant (PDA), a wireless modem, a wireless communication device, a handheld device, a laptop computer, a cordless phone, a wireless local loop (WLL) station, a smart phone, a netbook, a smartbook, a tablet, etc. A device 520 may communicate with base stations 510 in the wireless network 500 and may further communicate peer-to-peer with other devices 520. For example, as shown in FIG. 5, devices 520a and 520b may communicate peer-to-peer, devices 520c and 520d may communicate peer-to-peer, devices 520e and 520f may communicate peer-to-peer, and devices 520g, 520h, and 520i may communicate peer-to-peer, while remaining devices 520 may communicate with base stations 510. As further shown in FIG. 5, devices 520a, 520d, 520f, and 520h may also communicate with base stations 500, e.g., when not engaged in P2P communication or possibly concurrent with P2P communication.

In the description herein, WAN communication may refer to communication between a device 520 and a base station 510 in wireless network 500, e.g., for a call with a remote entity such as another device 520. A WAN device is a device 520 that is interested or engaged in WAN communication. P2P communication refers to direct communication between two or more devices 520, without going through any base station 510. A P2P device is a device 520 that is interested or engaged in P2P communication, e.g., a device 520 that has traffic data for another device 520 within proximity of the P2P device. Two devices may be considered to be within proximity of one another, for example, if each device 520 can detect the other device 520. In general, a device 520 may communicate with another device 520 either directly for P2P communication or via at least one base station 510 for WAN communication.

In one embodiment, direct communication between P2P devices 520 may be organized into P2P groups. More particularly, a P2P group generally refers to a group of two or more devices 520 interested or engaged in P2P communication and a P2P link refers to a communication link for a P2P group. Furthermore, in one embodiment, a P2P group may include one device 520 designated a P2P group owner (or a P2P server) and one or more devices 520 designated P2P clients that are served by the P2P group owner. The P2P group owner may perform certain management functions such as exchanging signaling with a WAN, coordinating data transmission between the P2P group owner and P2P clients, etc. For example, as shown in FIG. 5, a first P2P group includes devices 520a and 520b under the coverage of base station 510a, a second P2P group includes devices 520c and 520d under the coverage of base station 510b, a third P2P group includes devices 520e and 520f under the coverage of different base stations 510b and 510c, and a fourth P2P group includes devices 520g, 520h and 520i under the coverage of base station 510c. Devices 520a, 520d, 520f, and 520h may be P2P group owners for their respective P2P groups and devices 520b, 520c, 520e, 520g, and 520i may be P2P clients in their respective P2P groups. The other devices 520 in FIG. 5 may be engaged in WAN communication.

In one embodiment, P2P communication may occur only within a P2P group and may further occur only between the P2P group owner and the P2P clients associated therewith. For example, if two P2P clients within the same P2P group (e.g., devices 520g and 520i) desire to exchange information, one of the P2P clients may send the information to the P2P group owner (e.g., device 520h) and the P2P group owner may then relay transmissions to the other P2P client. In one embodiment, a particular device 520 may belong to multiple P2P groups and may behave as either a P2P group owner or a P2P client in each P2P group. Furthermore, in one embodiment, a particular P2P client may belong to only one P2P group or belong to multiple P2P group and communicate with P2P devices 520 in any of the multiple P2P groups at any particular moment. In general, communication may be facilitated via transmissions on the downlink and uplink. For WAN communication, the downlink (or forward link) refers to the communication link from base stations 510 to devices 520, and the uplink (or reverse link) refers to the communication link from devices 520 to base stations 510. For P2P communication, the P2P downlink refers to the communication link from P2P group owners to P2P clients and the P2P uplink refers to the communication link from P2P clients to P2P group owners. In certain embodiments, rather than using WAN technologies to communicate P2P, two or more devices may form smaller P2P groups and communicate P2P on a wireless local area network (WLAN) using technologies such as Wi-Fi, Bluetooth, or Wi-Fi Direct. For example, P2P communication using Wi-Fi, Bluetooth, Wi-Fi Direct, or other WLAN technologies may enable P2P communication between two or more mobile phones, game consoles, laptop computers, or other suitable communication entities.

Figure 6:
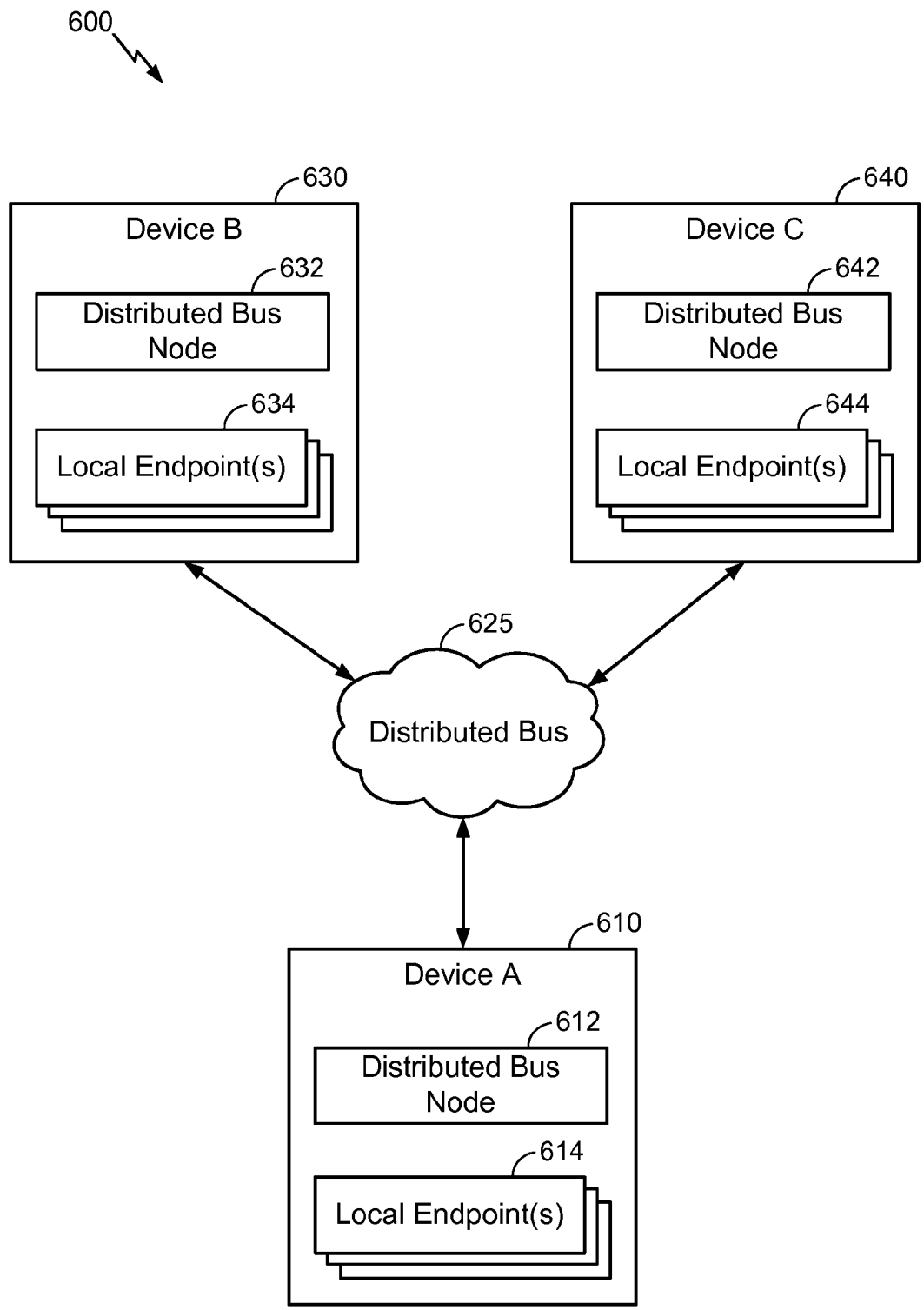
FIG. 6 illustrates an exemplary environment in which discoverable P2P services may be used to establish a proximity-based distributed bus over which various devices may communicate, in accordance with one aspect of the disclosure.

According to one aspect of the disclosure, FIG. 6 illustrates an exemplary environment 600 in which discoverable P2P services may be used to establish a proximity-based distributed bus over which various devices 610, 630, 640 may communicate. For example, in one embodiment, communications between applications and the like, on a single platform may be facilitated using an interprocess communication protocol (IPC) framework over the distributed bus 625, which may comprise a software bus used to enable application-to-application communications in a networked computing environment where applications register with the distributed bus 625 to offer services to other applications and other applications query the distributed bus 625 for information about registered applications. Such a protocol may provide asynchronous notifications and remote procedure calls (RPCs) in which signal messages (e.g., notifications) may be point-to-point or broadcast, method call messages (e.g., RPCs) may be synchronous or asynchronous, and the distributed bus 625 (e.g., a "daemon" bus process) may handle message routing between the various devices 610, 630, 640.

In one embodiment, the distributed bus 625 may be supported by a variety of transport protocols (e.g., Bluetooth, TCP/IP, Wi-Fi, CDMA, GPRS, UMTS, etc.). For example, according to one aspect, a first device 610 may include a distributed bus node 612 and one or more local endpoints 614, wherein the distributed bus node 612 may facilitate communications between local endpoints 614 associated with the first device 610 and local endpoints 634 and 644 associated with a second device 630 and a third device 640 through the distributed bus 625 (e.g., via distributed bus nodes 632 and 642 on the second device 630 and the third device 640). As will be described in further detail below with reference to FIG. 7, the distributed bus 625 may support symmetric multi-device network topologies and may provide a robust operation in the presence of device drops-outs. As such, the virtual distributed bus 625, which may generally be independent from any underlying transport protocol (e.g., Bluetooth, TCP/IP, Wi-Fi, etc.) may allow various security options, from unsecured (e.g., open) to secured (e.g., authenticated and encrypted), wherein the security options can be used while facilitating spontaneous connections with among the first device 610, the second device 630, and the third device 640 without intervention when the various devices 610, 630, 640 come into range or proximity to each other.

Figure 7:
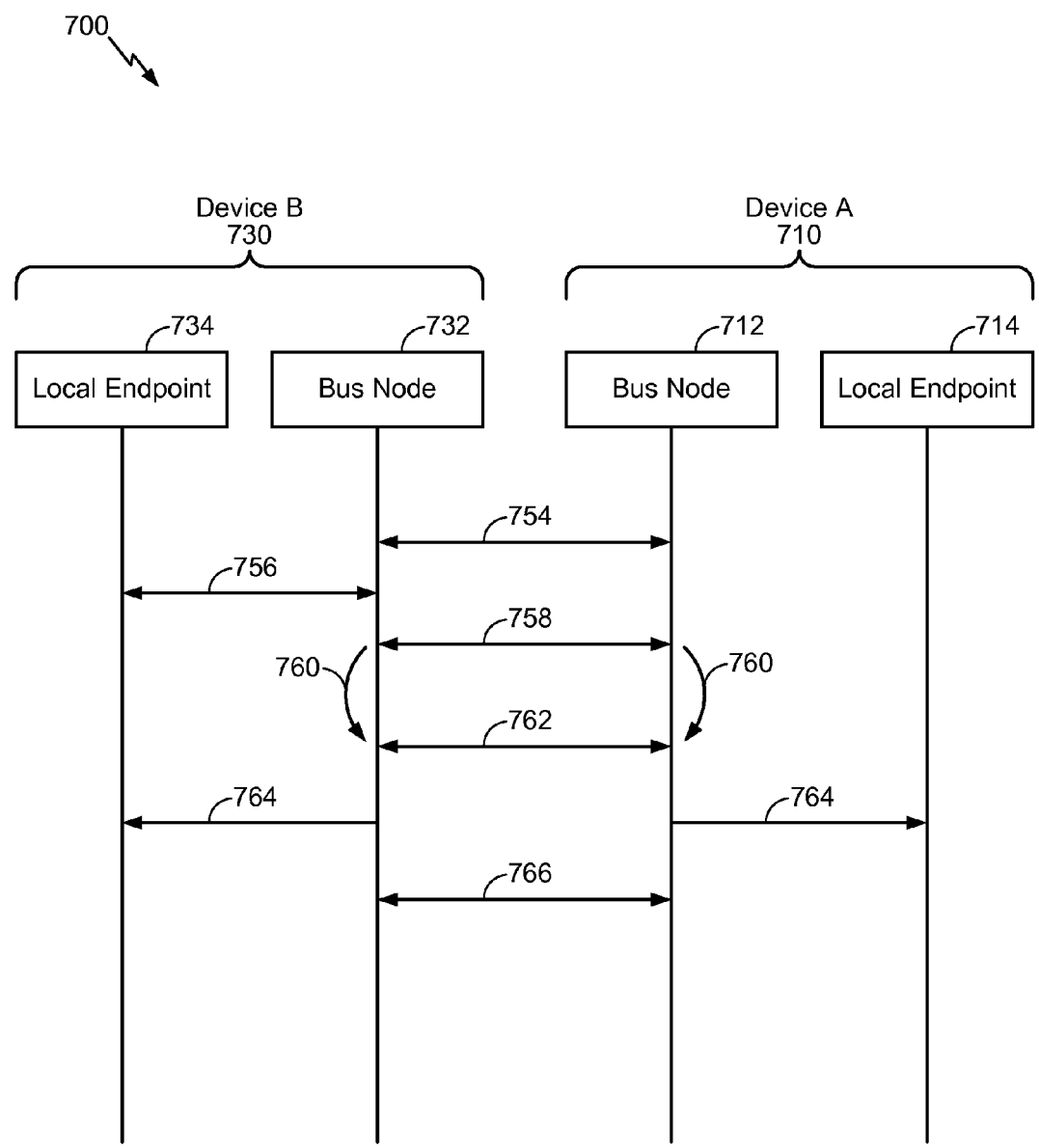
FIG. 7 illustrates an exemplary message sequence in which discoverable P2P services may be used to establish a proximity-based distributed bus over which various devices may communicate, in accordance with one aspect of the disclosure.

According to one aspect of the disclosure, FIG. 7 illustrates an exemplary message sequence 700 in which discoverable P2P services may be used to establish a proximity-based distributed bus over which a first device ("Device A") 710 and a second device ("Device B") 730 may communicate. Generally, Device A 710 may request to communicate with Device B 730, wherein Device A 710 may a include local endpoint 714 (e.g., a local application, service, etc.), which may make a request to communicate in addition to a bus node 712 that may assist in facilitating such communications. Further, Device B 730 may include a local endpoint 734 with which the local endpoint 714 may be attempting to communicate in addition to a bus node 732 that may assist in facilitating communications between the local endpoint 714 on the Device A 710 and the local endpoint 734 on Device B 730.

In one embodiment, the bus nodes 712 and 732 may perform a suitable discovery mechanism at message sequence step 754. For example, mechanisms for discovering connections supported by Bluetooth, TCP/IP, UNIX, or the like may be used. At message sequence step 756, the local endpoint 714 on Device A 710 may request to connect to an entity, service, endpoint etc., available through bus node 712. In one embodiment, the request may include a request-and-response process between local endpoint 714 and bus node 712. At message sequence step 758, a distributed message bus may be formed to connect bus node 712 to bus node 732 and thereby establish a P2P connection between Device A 710 and Device B 730. In one embodiment, communications to form the distributed bus between the bus nodes 712 and 732 may be facilitated using a suitable proximity-based P2P protocol (e.g., the AllJoyn™ software framework designed to enable interoperability among connected products and software applications from different manufacturers to dynamically create proximal networks and facilitate proximal P2P communication). Alternatively, in one embodiment, a server (not shown) may facilitate the connection between the bus nodes 712 and 732. Furthermore, in one embodiment, a suitable authentication mechanism may be used prior to forming the connection between bus nodes 712 and 732 (e.g., SASL authentication in which a client may send an authentication command to initiate an authentication conversation). Still further, during message sequence step 758, bus nodes 712 and 732 may exchange information about other available endpoints (e.g., local endpoints 644 on Device C 640 in FIG. 6). In such embodiments, each local endpoint that a bus node maintains may be advertised to other bus nodes, wherein the advertisement may include unique endpoint names, transport types, connection parameters, or other suitable information.

In one embodiment, at message sequence step 760, bus node 712 and bus node 732 may use obtained information associated with the local endpoints 734 and 714, respectively, to create virtual endpoints that may represent the real obtained endpoints available through various bus nodes. In one embodiment, message routing on the bus node 712 may use real and virtual endpoints to deliver messages. Further, there may be one local virtual endpoint for every endpoint that exists on remote devices (e.g., Device A 710). Still further, such virtual endpoints may multiplex and/or de-multiplex messages sent over the distributed bus (e.g., a connection between bus node 712 and bus node 732). In one aspect, virtual endpoints may receive messages from the local bus node 712 or 732, just like real endpoints, and may forward messages over the distributed bus. As such, the virtual endpoints may forward messages to the local bus nodes 712 and 732 from the endpoint multiplexed distributed bus connection. Furthermore, in one embodiment, virtual endpoints that correspond to virtual endpoints on a remote device may be reconnected at any time to accommodate desired topologies of specific transport types. In such an aspect, UNIX based virtual endpoints may be considered local and as such may not be considered candidates for reconnection. Further, TCP-based virtual endpoints may be optimized for one hop routing (e.g., each bus node 712 and 732 may be directly connected to each other). Still further, Bluetooth-based virtual endpoints may be optimized for a single pico-net (e.g., one master and n slaves) in which the Bluetooth-based master may be the same bus node as a local master node.

At message sequence step 762, the bus node 712 and the bus node 732 may exchange bus state information to merge bus instances and enable communication over the distributed bus. For example, in one embodiment, the bus state information may include a well-known to unique endpoint name mapping, matching rules, routing group, or other suitable information. In one embodiment, the state information may be communicated between the bus node 712 and the bus node 732 instances using an interface with local endpoints 714 and 734 communicating with using a distributed bus based local name. In another aspect, bus node 712 and bus node 732 may each may maintain a local bus controller responsible for providing feedback to the distributed bus, wherein the bus controller may translate global methods, arguments, signals, and other information into the standards associated with the distributed bus. At message sequence step 764, the bus node 712 and the bus node 732 may communicate (e.g., broadcast) signals to inform the respective local endpoints 714 and 734 about any changes introduced during bus node connections, such as described above. In one embodiment, new and/or removed global and/or translated names may be indicated with name owner changed signals. Furthermore, global names that may be lost locally (e.g., due to name collisions) may be indicated with name lost signals. Still further, global names that are transferred due to name collisions may be indicated with name owner changed signals and unique names that disappear if and/or when the bus node 712 and the bus node 732 become disconnected may be indicated with name owner changed signals.

As used above, well-known names may be used to uniquely describe local endpoints 714 and 734. In one embodiment, when communications occur between Device A 710 and Device B 730, different well-known name types may be used. For example, a device local name may exist only on the bus node 712 associated with Device A 710 to which the bus node 712 directly attaches. In another example, a global name may exist on all known bus nodes 712 and 732, where only one owner of the name may exist on all bus segments. In other words, when the bus node 712 and bus node 732 are joined and any collisions occur, one of the owners may lose the global name. In still another example, a translated name may be used when a client is connected to other bus nodes associated with a virtual bus. In such an aspect, the translated name may include an appended end (e.g., a local endpoint 714 with well-known name "org.foo" connected to the distributed bus with Globally Unique Identifier "1234" may be seen as "G1234.org.foo").

At message sequence step 766, the bus node 712 and the bus node 732 may communicate (e.g., broadcast) signals to inform other bus nodes of changes to endpoint bus topologies. Thereafter, traffic from local endpoint 714 may move through virtual endpoints to reach intended local endpoint 734 on Device B 730. Further, in operation, communications between local endpoint 714 and local endpoint 734 may use routing groups. In one aspect, routing groups may enable endpoints to receive signals, method calls, or other suitable information from a subset of endpoints. As such, a routing name may be determined by an application connected to a bus node 712 or 732. For example, a P2P application may use a unique, well-known routing group name built into the application. Further, bus nodes 712 and 732 may support registering and/or de-registering of local endpoints 714 and 734 with routing groups. In one embodiment, routing groups may have no persistence beyond a current bus instance. In another aspect, applications may register for their preferred routing groups each time they connect to the distributed bus. Still further, groups may be open (e.g., any endpoint can join) or closed (e.g., only the creator of the group can modify the group). Yet further, a bus node 712 or 732 may send signals to notify other remote bus nodes or additions, removals, or other changes to routing group endpoints. In such embodiments, the bus node 712 or 732 may send a routing group change signal to other group members whenever a member is added and/or removed from the group. Further, the bus node 712 or 732 may send a routing group change signal to endpoints that disconnect from the distributed bus without first removing themselves from the routing group.

The IoT permits connected devices to interact with each other in new ways. For example, IoT devices may track their interactions (e.g., emails, calls, text messages, proximity detections, etc.) with other IoT devices and assign relationship identifiers to the other IoT devices based on those interactions. A first IoT device may grant a second IoT device access to itself or to some other resource (e.g., another IoT device, a utility, such as electricity, water, gas, etc.) based on the relationship identifier the first IoT device assigned to the second IoT.

However, there are situations where an IoT device alone does not have enough information to assign a relationship identifier or grant access to a resource, and server access may be prohibitive, or even impossible. Accordingly, the IoT device may share information with another IoT device in order to assign a relationship identifier or grant access to a resource, but sharing information with another device requires determining whom to trust. The problem is circular.

The disclosure addresses this issue by providing a mechanism, which may be embodied in the information sharing module 216 in FIG. 2A, to incrementally share greater amounts of information. An IoT device, such as IoT device 200A in FIG. 2A, gathers and stores information about its environment, such as its MAC address, identifiers of proximal access points, the time of day, etc. When a second IoT device connects to a P2P network to which the first IoT device is connected, such as an AllJoyn™ network, the devices detect each other. After a threshold number of initial detections, the IoT devices may determine that they would like to increase their relationship, or trust, level, and therefore may share more information about themselves with each other. The devices may initially share limited high-level information having a low privacy level, such as their histories of connected access points at a specific location.

For example, at a first trust level, the IoT devices may share information having a low privacy level, such as their access to proximal data for an entire building. Specifically, the IoT devices can share their history of connections to the access points in that building with all of the devices they have encountered on the P2P network more than the threshold number of preliminary encounters. However, the IoT devices will not share information having a higher privacy level, such as their interactions with access points outside of the building.

Once the IoT devices analyze the shared data (e.g., the history of access point connections in the particular building), a new tier of relationships may be discovered. This allows the IoT devices to share even more information having a higher privacy level with each other, such as all access points to which the devices have connected, based on the results of that second relationship determination. Thus, in this example, there may be three tiers of data sharing: 1) the P2P network; 2) access point connections within a particular building; and 3) all access point connections, regardless of location. As the IoT devices move from tier to tier, more information is shared, but the sharing is done within a more select group of IoT devices.

These and other aspects of the disclosure will now be described in greater detail. The present disclosure presents a new definition for the terms "action" and "credentials." Traditionally, an "action" is a behavior that is allowed based on determined permissions, and "credentials" are a set of information that grants authorization to a set of actions.

Traditional security methods are discrete rather than continuous. For example, when a user accesses his or her bank account over the internet, the user can perform certain actions, such as viewing the account balance, paying bills, etc. When the user calls the bank and sends a fax, the user can perform a wire transfer. Accordingly, to access the user's account over the Internet, the user uses one set of credentials, and to send a wire transfer, the user uses another set of credentials. As such, there are two types of actions, viewing the account balance and making a wire transfer, and there are two types of credentials. However, the actions and credentials correspond to each other on a 1-1 ratio, as each of the two is in a different domain.

In contrast, the disclosure provides for multiple levels of credentials that lead to multiple levels of trust and related actions. The methodology of the disclosure is incremental, since determined permissions are cumulative. In this disclosure, sharing additional information is one of the "actions" that may become allowed based on determining an increased level of trust, and the information that was shared becomes the credentials for the next level of trust. As such, there is a recursive relationship between actions and credentials.

Figure 8A:
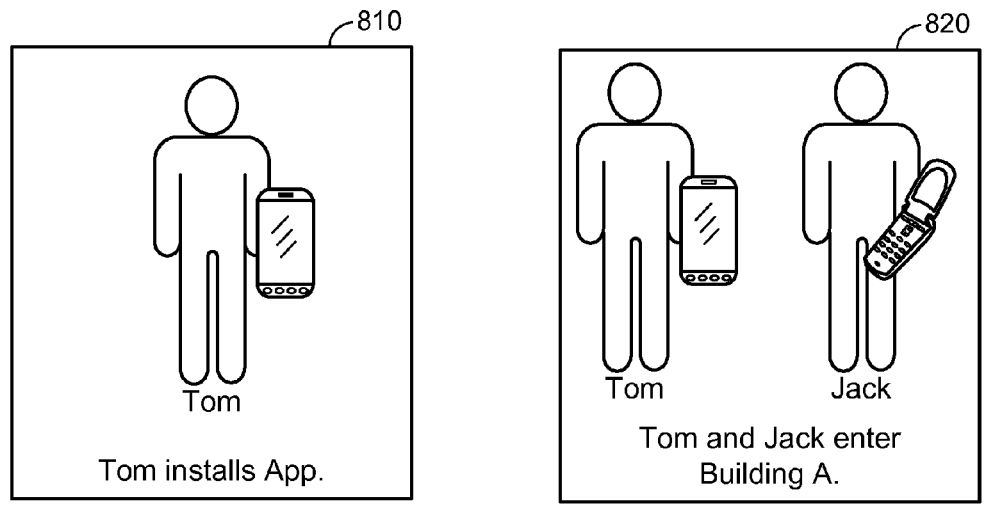
FIGS. 8A-D illustrate an exemplary storyline for incrementally sharing greater amounts of information from the perspective of a first user according to an aspect of the disclosure.

FIGS. 8A-D illustrate an exemplary storyline for incrementally sharing greater amounts of information having incrementally higher privacy levels from the perspective of a first user according to an aspect of the disclosure. In FIG. 8A, at 810, the first user ("Tom") installs an application implementing the disclosed aspects on his IoT device, such as an application embodying the information sharing module 216 in FIG. 2A. At 820, Tom and a second user ("Jack") enter the same building ("Building A"). Tom and Jack's IoT devices may connect to one or more access points in Building A as they move around the building.

Figure 8B:
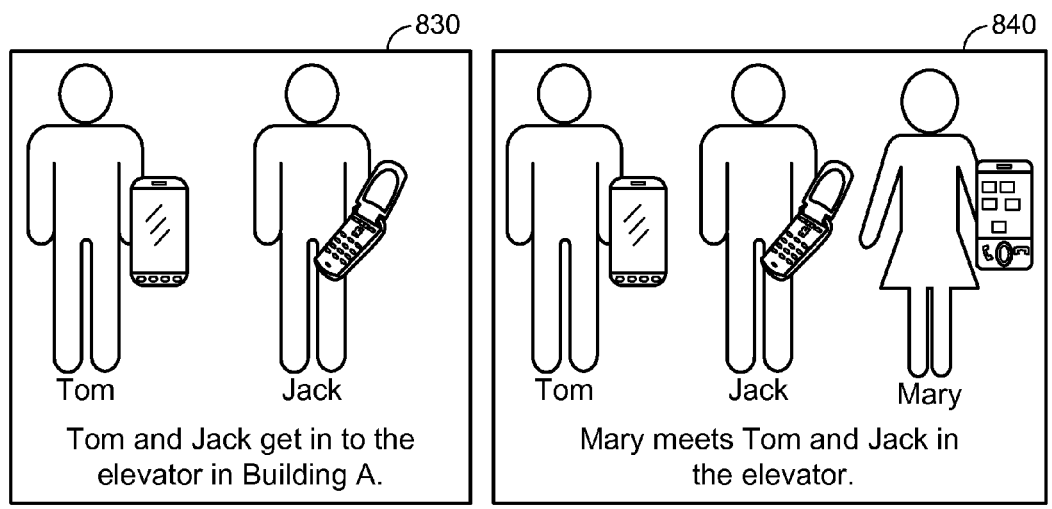

In FIG. 8B, at 830, Tom and Jack get on an elevator in Building A. Their IoT devices connect over a P2P network, such as an AllJoyn™ network, and log the encounter. The P2P network may be hosted by either Tom or Jack's IoT device. At 840, a third user ("Mary") then meets Tom and Jack in the elevator. Mary's IoT device may connect to the same P2P network to which Tom and Jack's IoT devices are connected, and the three IoT devices may log the encounter.

Figure 8C:
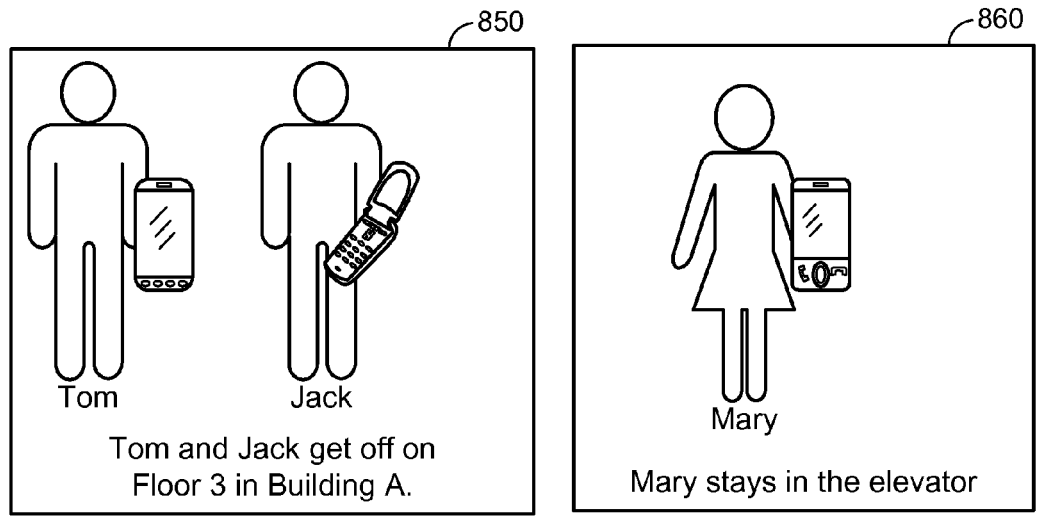

In FIG. 8C, at 850, Tom and Jack exit the elevator on the same floor (e.g., the third floor) and, at 860, Mary stays on the elevator. The users' IoT devices log the interaction (i.e., that Mary's IoT device is no longer connected to the P2P network but that Tom and Jack's IoT devices are).

Figure 8D:
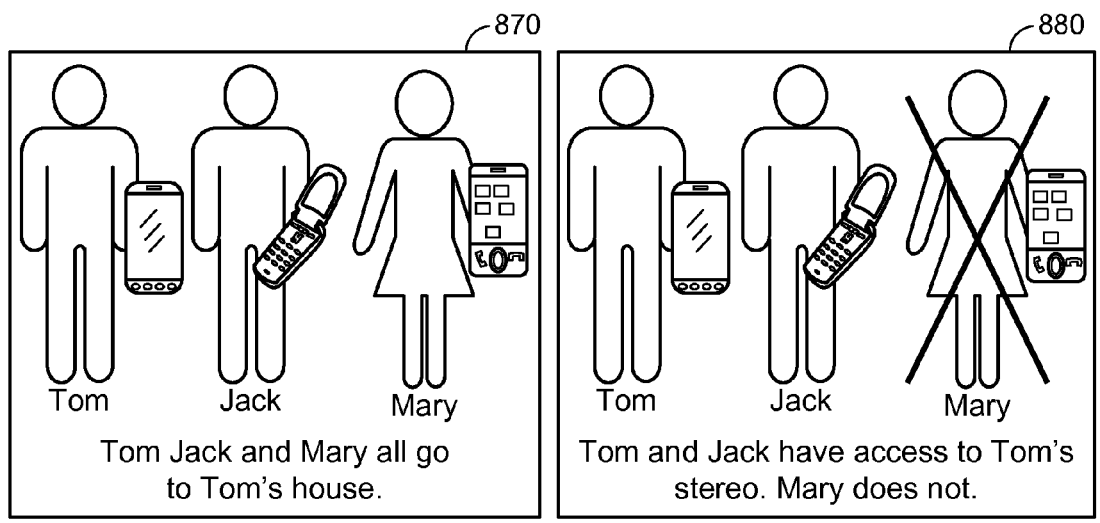

In FIG. 8D, at 870, Tom, Jack, and Mary all go to Tom's house. Each of the users' IoT devices may connect to the same P2P network, which may be hosted by one of their IoT devices or a device at Tom's home. Because Tom's IoT device has more interactions with Jack's IoT device than it does with Mary's IoT device (e.g., Jack got off the elevator on the same floor as Tom), Tom's IoT device has shared more information and granted greater access to Jack's IoT device, as described herein. As such, at 880, Jack is granted access to Tom's stereo but Mary is not.

The disclosure proposes three classes of "events" that can be used to realize the aspects disclosed herein. A first IoT device is considered to be self-aware. Additionally, it can receive "events" from a second IoT device over a P2P network. There are three classes of events: 1) no events, but the IoT devices are aware of their own location ID (referred to as "self-knowledge"); 2) an event containing time, device ID, and location ID parameters; and 3) an event from class 2) plus content (content is never necessary, but is always helpful).

There are three ways to work with events. First, a client model, in which all event handling takes place at the first IoT device. In this case, relationship modelling requires events from class 2) above. Second, a client-server model, in which events are handled at the first IoT device and transported to the server. In this case, relationship modelling is done at the server and requires events from class 1) above. Third, a hybrid model, in which events are handled at the first IoT device and the second IoT device. In this case, events are shared between the devices and relationship modelling is done at each IoT device independently. This requires events from class 1) above.

There are a number of advantages to the hybrid model of event sharing. The hybrid model allows for maximum leveraging of existing P2P functionality. For example, there is no concern about securely transferring information to remote server as in the client-server model. There is also not an excess of information sharing, as there may be in the client-only model, which requires that devices share their location data (e.g., access point MAC address, GPS, etc.) at each P2P interaction. Additionally, the hybrid model allows for only the first user to install the application and to simply invite friends when necessary. This provides a viral component. In contrast, the client-only and client-server models require that all users install the application.

As discussed above, an IoT device can incrementally assign higher relationship statuses, or trust levels, to another IoT device with which it interacts and incrementally share greater amounts of information based on the higher trust levels. The following provides a high-level overview of this algorithm. Upon detecting each other, a first IoT device and a second IoT device can ask each other:

1. Do we interact during the day?
2. If yes:
   a. Assign second device a relationship status/trust level based on current information.

b. Share self-knowledge with the other IoT device based on the relationship status/trust level and on the location at which the relationship was built.

c. Share a pre-selected category of self-knowledge based on the previous iteration.

3. Go to 2.

As shown, the communication takes place iteratively resulting in a dynamic relationship status, or trust level, upon which further information sharing and security (e.g., resource sharing) can be based.

Figure 9A:
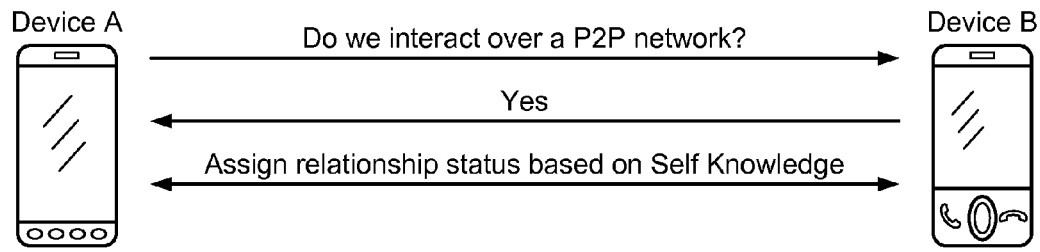
FIGS. 9A-C illustrate an exemplary flow in which a first IoT device incrementally assigns higher trust levels to a second IoT device and shares incrementally greater amounts of information based on the higher trust levels.
Figure 9B:
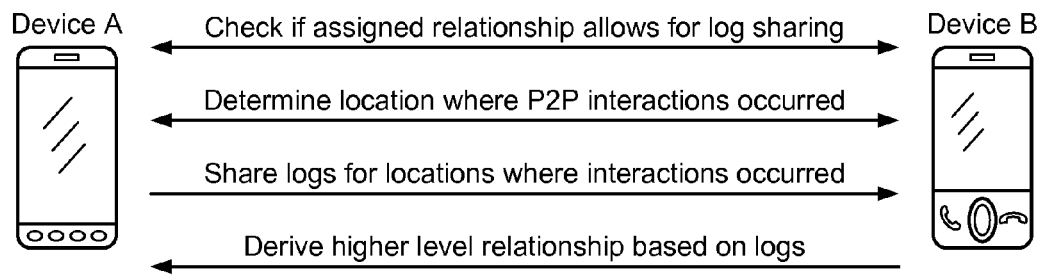
Figure 9C:
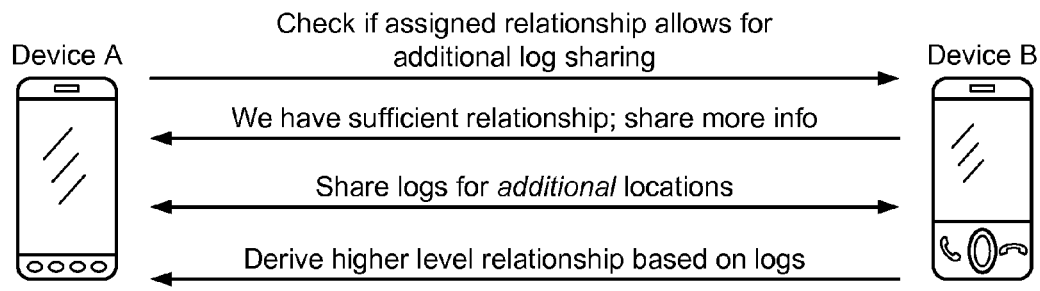

FIGS. 9A-C illustrate an example of the above algorithm, in which a first IoT device ("Device A") having an information sharing module 216 incrementally assigns higher trust levels to a second IoT device ("Device B"), also having an information sharing module 216, and shares incrementally greater amounts of information based on the higher trust levels. In FIG. 9A, Device A asks Device B if they interact over a P2P network, such as an AllJoyn™ network. Device B responds that "yes" they do. This interaction may simply be a determination that both Device A and Device B are connected to the same P2P network. Based on this determination, Devices A and B assign an initial relationship status (or trust level) to the other device based on self-knowledge.

In FIG. 9B, Devices A and B determine whether or not the assigned relationship statuses allows for log sharing of log data having a first (low) privacy level. If they do, the devices determine the locations where P2P interactions occurred and share logs for those locations. The shared locations may be shared places, such as buildings, businesses, homes, etc., shared coordinates, such as GPS coordinates, shared access points, shared cellular network base stations, etc. The shared logs may be logs of access points to which the devices connected at the shared locations. Based on the logs, Devices A and B may derive higher relationship statuses for each other. The devices may analyze the log data to determine whether or not they were connected to the same access points, whether or not at the same times, whether or not at the same frequency, etc.

In FIG. 9C, Device A determines whether or not the newly assigned relationship status allows for additional log sharing of log data having a second (higher) privacy level. Device B responds that the two devices do have a sufficiently high relationship status and that additional information can therefore be shared. Accordingly, Devices A and B share logs for additional locations, that is, locations other than the locations where their P2P interactions occurred. Based on the logs, Devices A and B may derive higher relationship statuses for each other. As before, the devices may analyze the log data to determine whether or not they were connected to the same access points, whether or not at the same times, whether or not at the same frequency, etc.

The operations illustrated in FIG. 9C can be repeated until some exit condition is satisfied. The exit condition may be that the highest trust level has been assigned, that all relevant log data has been shared, that all log data the user permits to be shared has been shared, etc. Alternatively, or additionally, the IoT devices may iterate until they are no longer connected over the P2P network. In that case, they can maintain the shared log data for a period of time. In that way, if they reconnect within that time period, they will not have to re-exchange the log data, but rather, will be able to continue from where they stopped.

The highest trust level assigned during the iteration process is then stored and used when interacting with the IoT device in the future. However, if the IoT devices do not interact again during some threshold period of time, the trust level may be reduced to a lower trust level. In this way, the trust level degrades over time if there is no continued interaction between the IoT devices.

There may also be battery management and network resource utilization issues with iteratively transferring log data between two devices. To address this, the interacting devices may send a finite amount of log data, e.g., one day, three days, one week, etc., which may be negotiated by the devices or set as a user preference.

Figure 10:
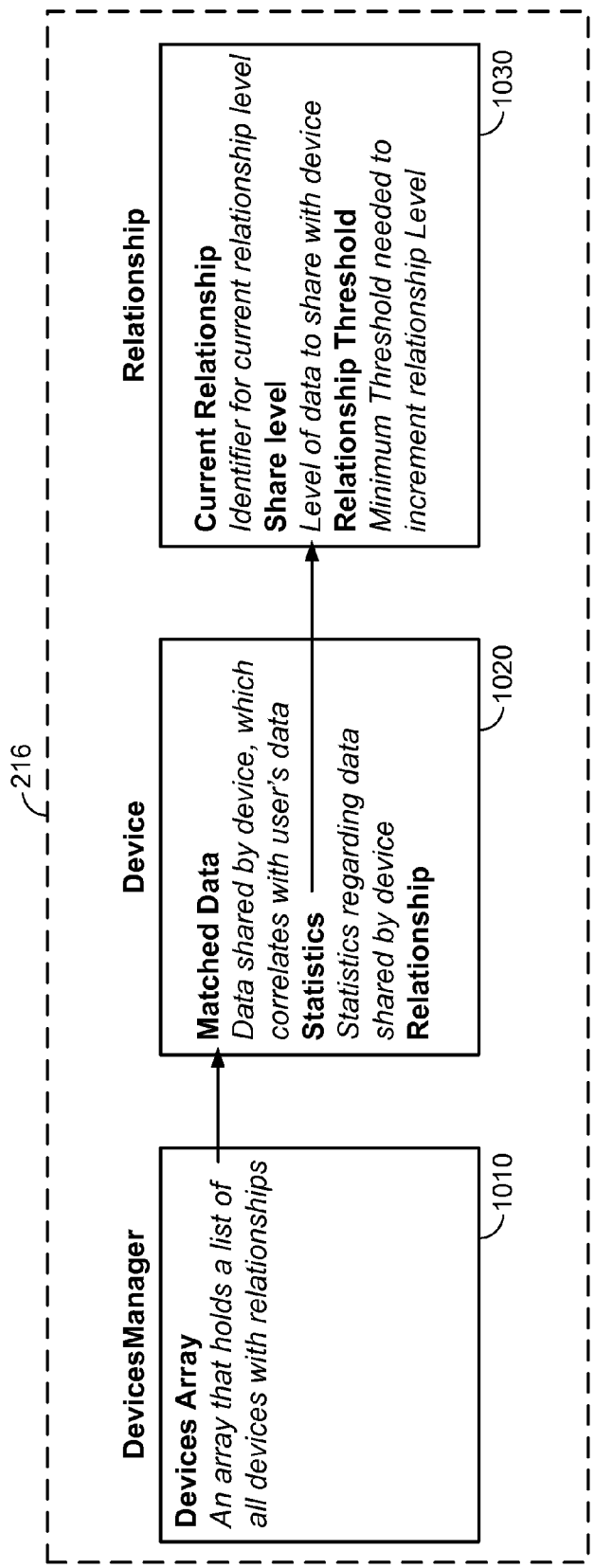
FIG. 10 illustrates an exemplary object model according to an aspect of the disclosure.

FIG. 10 illustrates an exemplary object model according to an aspect of the disclosure. The object model may be embodied in an information sharing module, such as information sharing module 216 in FIG. 2A. A DevicesManager object 1010 may store multiple Device objects 1020 in a Devices Array for ease of access and management. A Device object 1020 may store information relating to each detected device. The Device object 1020 can store the shared data that has been matched, statistics regarding the shared data, as well as a Relationship object 1030. The Relationship object 1030 can store the current relationship level, the share level, which may or may not be directly related to the relationship level, as well as the relationship threshold, which can describe the threshold necessary to increment or decrement the relationship to one level above or below the current level.

The following provides more details regarding the establishment of relationships using the object model illustrated in FIG. 10. A main component in establishing and maintaining relationships with other devices is the Devices Manager class 1010. This class contains an array of Devices (of class Device 1020) that enables the application to track proximal devices and their relationships. The Device object 1020 can have components in three categories, Matched Data, Statistics, and Relationship.

The Matched Data component, or object, keeps track of the matched data using a separate class per data type (e.g., locations, notifications, etc.) and maintaining an array of the corresponding class for each kind of data. The Matched Data object is used to calculate the statistics.

The Statistics component, or object, keeps track of the coincidence average, which in turn, is used to compute the current relationship level, or trust level. As statistics change, the relationship level may be increased, decreased, or remain the same.

The Relationship component, or object, keeps track of the Share Level, Relationship Threshold, and Current Relationship/Trust Level components/objects. The Share Level/Privacy Level component determines what level of data one device is willing to share with another, which is decided based on the Current Relationship component. Initially, all devices are set to the lowest level of sharing, together with the lowest level of relationship. As the relationship level/trust level is increased, the share level/privacy level is increased in tandem, as described above with reference to FIGS. 9A-C. When one device establishes contact with another, it can automatically share the appropriate data based on the current share level/privacy level. When a device receives data of a particular type, it can then check the Log object to compare that type of data. The Log object can update the Matched Data component, completing the cycle.

The Relationship Threshold value represents the level of coincidence that will place a device in a particular relationship category, meaning how much matched data is required to upgrade to the next level of relationship/trust. It can be given default values that may be altered by the user based on personal preferences. These values can be managed by the Devices Manager 1010, which can save/load the data on exit/startup, so that even after exiting the application, the existing relationships will be preserved.

The following describes a method of logging and processing the exchanged data. There are a number of data types that can be used to determine levels of relationships/trust. The data that will be logged for a user's own device, and the data received from other devices, can be logged in the device's file system under the Relationships/<device id> directory, for example. The file name may be the data type followed by the date. After processing the logs, determining the overlap of the data, and updating the relationship accordingly, irrelevant files can be removed.

The Logs object represents a base class that each of the data types inherit from and implement in the relevant way. There may be a Logs object for each data type that corresponds to a level of relationship. This structure enables new data types to be easily added by building from the Logs base class. New data types may allow for more sophisticated determination of relationship levels/trust levels.

The base class contains three main functions:
1. findUncheckedLogs( ): implemented in the base class and calls,
2. compareLogs( ): an abstract function in the base class to be implemented by the objects, and
3. getDataOvarlap( ): an abstract function in the base class to give matching data.

The base class may contain a findUncheckedLogs function that loops over all the directories of known devices and finds the logs that were not yet processed. Then, on those log files, the compareLogs function can be called. This function has the appropriate method to compare the specific log type and check the fields that should be compared. Overlapping data can be saved in an array of objects of the corresponding data type. Each of the data types may have a prototype object.

The prototype object may include the following variables (all followed with setters and getters): "mDate," the timestamp, "mCount," the amount of times this data occurs on the same date or in a particular time frame, and "information," the relevant data for the current log type. For example, the location type may be the WiFi access point, the BSSID, the SSID, the GPS coordinates, etc. As another example, the notification type may be the AppName, AppId, etc. Based on this process, the relationship can be increased/decreased.

The messageHandlerClass is an important class in controlling the flow, as it is the one handling the incoming messages from all the outside devices. This class is also the first to be notified when a new device is detected, shares logs, etc. When a new device completes the handshake, the Message Handler is notified and starts the process of building a relationship by initially adding the new device to the existing device list and sharing the basic level of data with it. When the corresponding data arrives in response, the Message Handler triggers a data save and compare. It then updates the relationship/trust level based on the recent activity and updates the share levels/privacy levels as well. As such, a new level of data can be shared the next time the devices interact, if applicable. At a timed interval (e.g., once daily), all relevant data can be shared with each known device based on current relationship/trust and share/privacy levels.

Note that the relationship/trust level and share/privacy level may not be commensurate. The trust level specifies the level of trust a first device has for a second device and thus the level of access the first device will grant to the second device, whereas the privacy level specifies the type and/or amount of data that may be shared between the devices, as described herein. In some embodiments, a given trust level may allow access to data having a commensurate privacy level, but this is not necessary.

Figure 11:
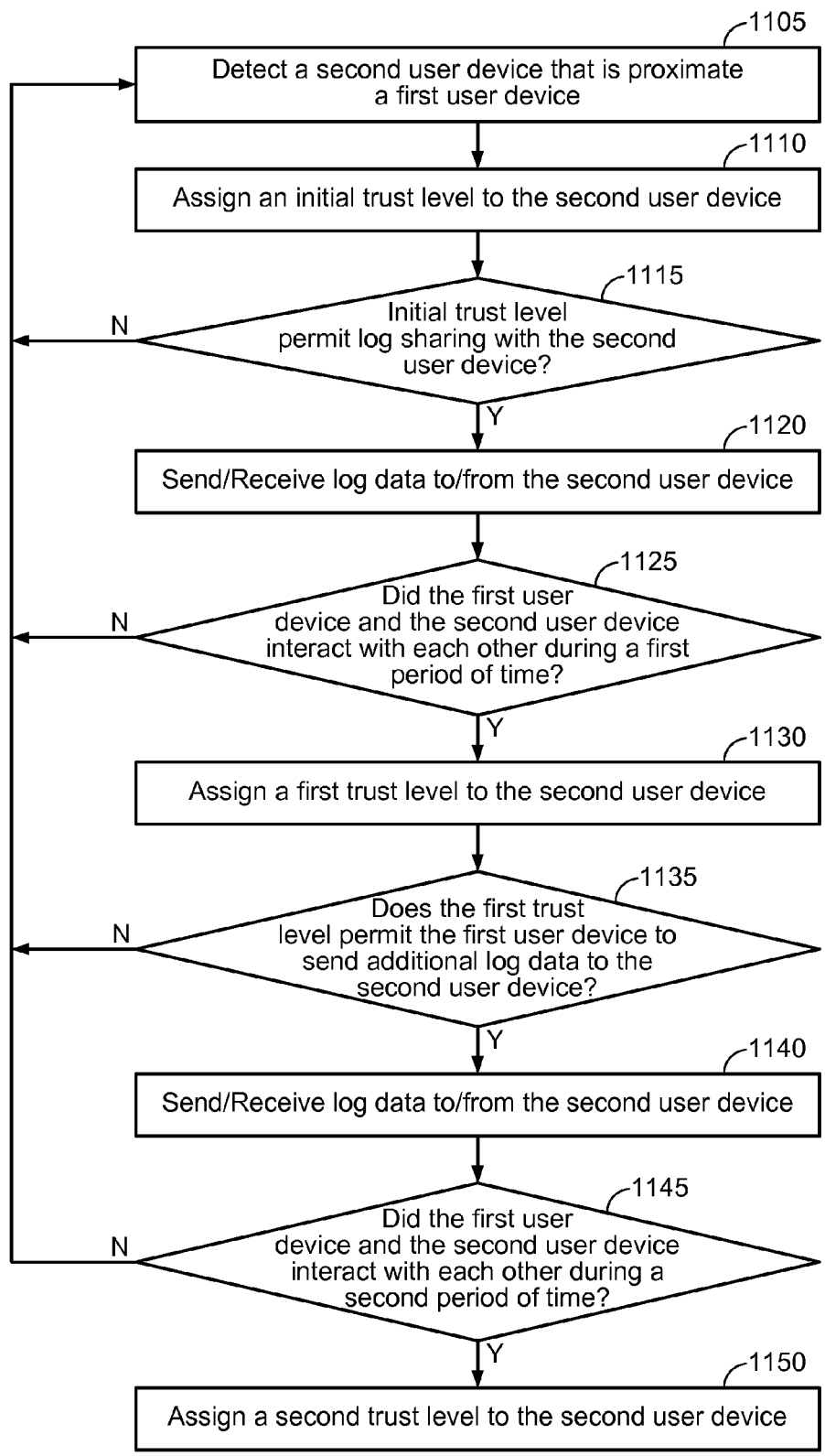
FIG. 11 illustrates an exemplary flow for incrementally sharing increasing amounts of information between two or more user devices according to an aspect of the disclosure.

FIG. 11 illustrates an exemplary flow for incrementally sharing increasing amounts of information between two or more user devices, as described herein. The user devices may be IoT devices with information sharing modules 216, as described above. At 1105, a first user device detects a second user device that is proximate the first user device. The first user device may detect and communicate with the second user device over a P2P network, such as an AllJoyn™ network.

At 1110, the first user device assigns an initial trust level to the second user device based on determinable characteristics of the second user device. The first user device may determine the determinable characteristics by communicating with the second user device over the P2P network. This may correspond to the assignment of an initial trust level based on "self-knowledge" discussed above with reference to FIG. 9A.

At 1115, the first user device determines whether or not the initial trust level permits log sharing with the second user device. If it does not, then the flow returns to 1105, where the first user device may detect the second user device again at a later time. Otherwise, if the initial trust level permits log sharing, then at 1120, the first user device sends initial log data having an initial privacy level to the second user device and receives first log data having a first privacy level from the second user device. The first log data may be log data of the second user device over a first period of time. Likewise, the initial log data may be log data of the first user device over the first period of time. Blocks 1115 and 1120 may correspond to the first and third operations, respectively, of FIG. 9B.

As an example, the first log data may include first location data of the second user device over the first period of time. The first location data may include a list of access points to which the second user device was attached during the first time period. In this case, determining whether the first user device and the second user device interacted with each other during the first period of time may include determining whether the first user device and the second user device were proximate each other during the first period of time based on the first location data. Determining whether the first user device and the second user device were proximate each other during the first period of time may include determining a number of times that the first user device and the second user device were proximate each other during the first period of time At 1125, the first user device determines whether or not it and the second user device interacted with each other during the first period of time based on the received first log data. Determining whether the first user device and the second user device interacted with each other during the first period of time may include determining whether the first user device and the second user device interacted with each other during the first period of time by comparing the initial log data and the received first log data.

If the first user device and the second user device did not interact with each other during the first period of time, then the flow returns to 1105, where the first user device may detect the second user device again at a later time. Otherwise, if they did interact with each other during the first period of time, then at 1130, the first user device assigns a first trust level to the second user device. The first trust level is a higher trust level than the initial trust level. Blocks 1125 and 1130 may correspond to the fourth operation of FIG. 9B.

At 1135, the first user device determines whether or not the first trust level permits it to send additional log data to the second user device. The additional log data has a higher privacy level than the initial log data. If it does not, then the flow returns to 1105, where the first user device may detect the second user device again at a later time. Otherwise, if the first trust level permits the first user device to send additional log data to the second user device, then at 1140, the first user device sends the additional log data to the second user device and receives second log data having a second privacy level from the second user device. The additional log data and the second log data may be log data of the first and second user devices, respectively, over a second period of time. The additional log data and the second log data may also have a higher privacy level than the initial log data and the first log data, respectively. Blocks 1135 and 1140 may correspond to the first, second, and third operations of FIG. 9C.

As an example, the second log data may include second location data of the second user device over the second period of time. The second location data may include geographic coordinates of the second user device during the second time period.

At 1145, the first user device determines whether it and the second user device interacted with each other during the second period of time based on the received second log data. If they did not, then the flow returns to 1105, where the first user device may detect the second user device again at a later time. Otherwise, if the first user device and the second user device interacted with each other during the second period of time, then at 1150, the first user device assigns a second trust level to the second user device. The second trust level is a higher trust level than the first trust level. Although they do not have to be, the first period of time and the second period of time may be the same period of time. Blocks 1145 and 1150 may correspond to the fourth operation of FIG. 9C.

As an example, assigning the first trust level to the second user device may be based on determining that the first user device and the second user device interacted with each other a first threshold number of times during the first period of time. Similarly, assigning the second trust level to the second user device may be based on determining that the first user device and the second user device interacted with each other a second threshold number of times during the second period of time. In this case, the second threshold may be greater than the first threshold.

Although not illustrated in FIG. 11, the first user device may detect a third user device that is proximate the first user device. The first user device may receive third log data from the third user device, where the third log data may be log data of the third user device over a third period of time. The first user device may determine whether the third user device and the third user device interacted with each other during the third period of time based on the received third log data. The first user device may assign the first trust level to the third user device based on the first user device and the third user device having interacted with each other during the third period of time.

The first user device may receive fourth log data from the third user device, where the fourth log data may be log data of the third user device over a fourth period of time, and where the fourth log data has a higher privacy level than the third log data. The first user device may determine whether the first user device and the third user device interacted with each other during the second period of time based on the received fourth log data. The first user device may assign the second trust level to the third user device based on the first user device and the third user device having interacted with each other during the fourth period of time.

Figure 12:
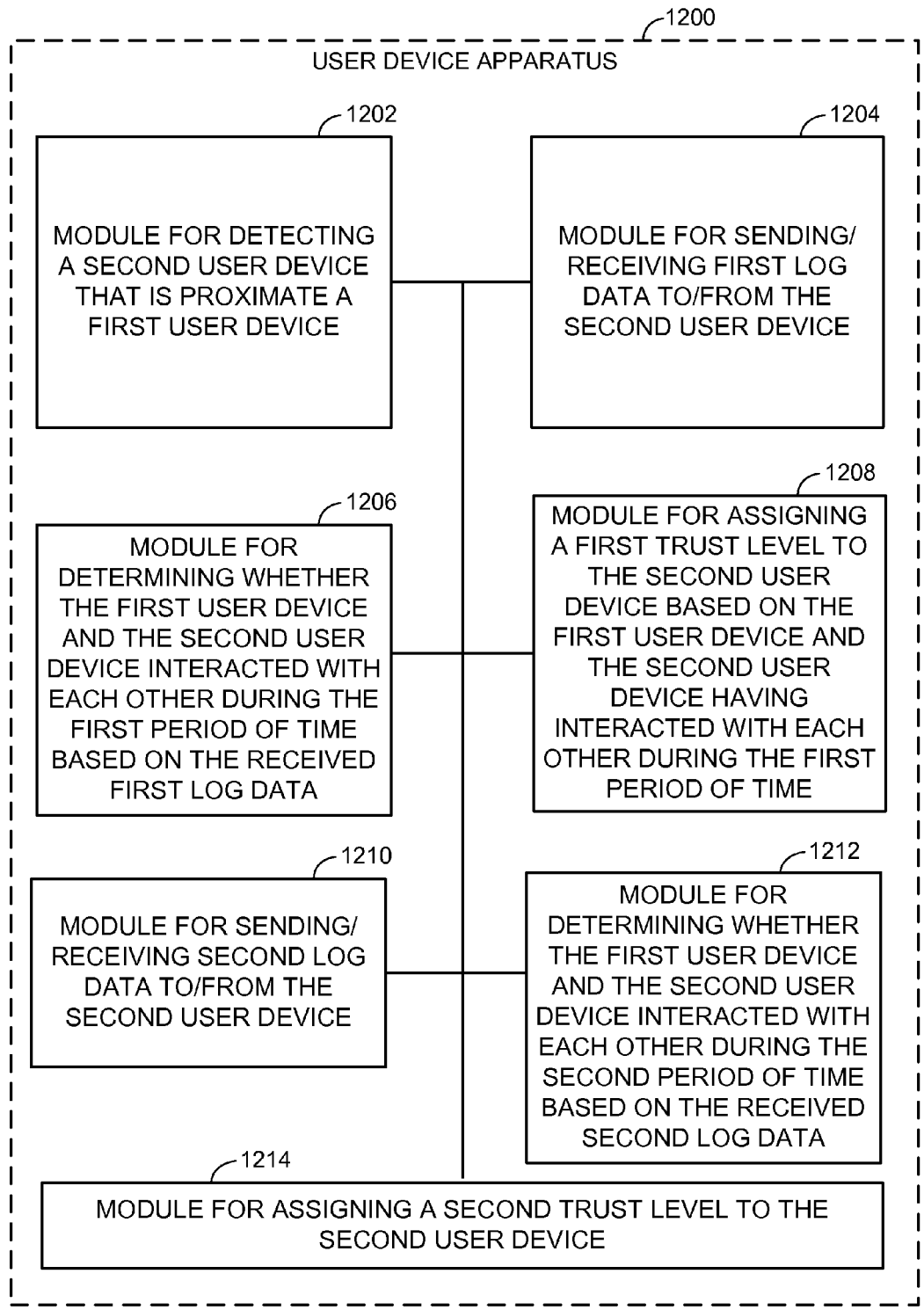
FIG. 12 is a simplified block diagram of several sample aspects of an apparatus configured to support communication as taught herein.

FIG. 12 illustrates an example user device apparatus 1200 represented as a series of interrelated functional modules. A module for detecting 1202 may correspond at least in some aspects to, for example, a communication device, such as transceiver 206, as discussed herein. A module for sending/receiving 1204 may correspond at least in some aspects to, for example, a communication device, such as transceiver 206, or a processing system, such as processor 208, in conjunction with an information sharing module, such as information sharing module 216, as discussed herein. A module for determining 1206 may correspond at least in some aspects to, for example, a processing system, such as processor 208, in conjunction with an information sharing module, such as information sharing module 216, as discussed herein. A module for assigning 1208 may correspond at least in some aspects to, for example, a processing system, such as processor 208, in conjunction with an information sharing module, such as information sharing module 216, as discussed herein. A module for sending/receiving 1210 may correspond at least in some aspects to, for example, a communication device, such as transceiver 206, or a processing system, such as processor 208, in conjunction with an information sharing module, such as information sharing module 216, as discussed herein. A module for determining 1212 may correspond at least in some aspects to, for example, a processing system, such as processor 208, in conjunction with an information sharing module, such as information sharing module 216, as discussed herein. A module for assigning 1214 may correspond at least in some aspects to, for example, a processing system, such as processor 208, in conjunction with an information sharing module, such as information sharing module 216, as discussed herein.

The functionality of the modules of FIG. 12 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIG. 12, as well as other components and functions described herein, may be implemented using any suitable means. Such means also may be implemented, at least in part, using corresponding structure as taught herein. For example, the components described above in conjunction with the "module for" components of FIG. 12 also may correspond to similarly designated "means for" functionality. Thus, in some aspects one or more of such means may be implemented using one or more of processor components, integrated circuits, or other suitable structure as taught herein.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The methods, sequences and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in an IoT device. In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes CD, laser disc, optical disc, DVD, floppy disk and Blu-ray disc where disks usually reproduce data magnetically and/or optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method for incrementally sharing increasing amounts of information between two or more user devices, comprising:
   detecting a second user device that is proximate a first user device;
   receiving first log data having a first privacy level from the second user device, wherein the first log data comprises log data of the second user device over a first period of time;
   determining whether the first user device and the second user device interacted with each other during the first period of time based on the first log data;
   assigning a first trust level to the second user device based on the first user device and the second user device having interacted with each other during the first period of time, the first trust level corresponding to a second privacy level of information to be shared with the second user device;
   receiving second log data having the second privacy level from the second user device, wherein the second log data comprises log data of the second user device over a second period of time, and wherein the second privacy level is higher than the first privacy level;
   determining whether the first user device and the second user device interacted with each other during the second period of time based on the second log data; and
   assigning a second trust level to the second user device based on the first user device and the second user device having interacted with each other during the second period of time.

2. The method of claim 1, wherein the first log data comprises first location data of the second user device over the first period of time.

3. The method of claim 2, wherein the first location data comprises a list of access points to which the second user device was attached during the first period of time.

4. The method of claim 2, wherein determining whether the first user device and the second user device interacted with each other during the first period of time comprises determining whether the first user device and the second user device were proximate each other during the first period of time based on the first location data.

5. The method of claim 4, wherein determining whether the first user device and the second user device were proximate each other during the first period of time comprises determining a number of times that the first user device and the second user device were proximate each other during the first period of time.

6. The method of claim 1, wherein the second log data comprises second location data of the second user device over the second period of time.

7. The method of claim 6, wherein the second location data comprises geographic coordinates of the second user device during the second period of time.

8. The method of claim 1, wherein assigning the first trust level to the second user device is based on determining that the first user device and the second user device interacted with each other a first threshold number of times during the first period of time; and
wherein assigning the second trust level to the second user device is based on determining that the first user device and the second user device interacted with each other a second threshold number of times during the second period of time.

9. The method of claim 8, wherein the second threshold is greater than the first threshold.

10. The method of claim 1, further comprising:
assigning an initial trust level to the second user device based on determinable characteristics of the second user device, the first user device determining the determinable characteristics by communicating with the second user device over a peer-to-peer network.

11. The method of claim 10, further comprising:
determining whether or not the initial trust level permits log sharing with the second user device; and
sending initial log data of the first user device to the second user device based on the initial trust level permitting log sharing with the second user device.

12. The method of claim 11, further comprising:
determining whether or not the first trust level permits additional log sharing with the second user device; and
sending additional log data to the second user device based on the first trust level permitting additional log sharing with the second user device, wherein the additional log data has a higher privacy level than the initial log data.

13. The method of claim 11, wherein determining whether the first user device and the second user device interacted with each other during the first period of time comprises determining whether the first user device and the second user device interacted with each other during the first period of time by comparing the initial log data and the first log data.

14. The method of claim 1, wherein the first period of time and the second period of time comprise a same period of time.

15. The method of claim 1, further comprising:
detecting a third user device that is proximate the first user device;
receiving third log data from the third user device, wherein the third log data comprises log data of the third user device over a third period of time;
determining whether the first user device and the third user device interacted with each other during the third period of time based on the third log data; and
assigning the first trust level to the third user device based on the first user device and the third user device having interacted with each other during the third period of time.

16. The method of claim 15, further comprising:
receiving fourth log data from the third user device, wherein the fourth log data comprises log data of the third user device over a fourth period of time, and wherein the fourth log data has a higher privacy level than the third log data;
determining whether the first user device and the third user device interacted with each other during the second period of time based on the fourth log data; and
assigning the second trust level to the third user device based on the first user device and the third user device having interacted with each other during the fourth period of time.

17. The method of claim 1, wherein the first log data and the second log data are received over a peer-to-peer network.

18. An apparatus for incrementally sharing increasing amounts of information between two or more user devices, comprising:
a transceiver configured to detect a second user device that is proximate a first user device, and to receive first log data having a first privacy level from the second user device, wherein the first log data comprises log data of the second user device over a first period of time; and
a processor configured to determine whether the first user device and the second user device interacted with each other during the first period of time based on the first log data, and to assign a first trust level to the second user device based on the first user device and the second user device having interacted with each other during the first period of time, the first trust level corresponding to a second privacy level of information to be shared with the second user device,
wherein the transceiver is further configured to receive second log data having the second privacy level from the second user device, wherein the second log data comprises log data of the second user device over a second period of time, and wherein the second privacy level is higher than the first privacy level, and
wherein the processor is further configured to determine whether the first user device and the second user device interacted with each other during the second period of time based on the second log data, and to assign a second trust level to the second user device based on the first user device and the second user device having interacted with each other during the second period of time.

19. The apparatus of claim 18, wherein the first log data comprises first location data of the second user device over the first period of time.

20. The apparatus of claim 19, wherein the first location data comprises a list of access points to which the second user device was attached during the first period of time.

21. The apparatus of claim 19, wherein the processor being configured to determine whether the first user device and the second user device interacted with each other during the first period of time comprises the processor being configured to determine whether the first user device and the second user device were proximate each other during the first period of time based on the first location data.

22. The apparatus of claim 19, wherein the processor being configured to assign the first trust level to the second user device is based on a determination that the first user device and the second user device interacted with each other a first threshold number of times during the first period of time, and
  wherein the processor being configured to assign the second trust level to the second user device is based on a determination that the first user device and the second user device interacted with each other a second threshold number of times during the second period of time.

23. The apparatus of claim 18, wherein the second log data comprises second location data of the second user device over the second period of time.

24. The apparatus of claim 23, wherein the second location data comprises geographic coordinates of the second user device during the second period of time.

25. The apparatus of claim 18, wherein the processor is further configured to:
  assign an initial trust level to the second user device based on determinable characteristics of the second user device, wherein the first user device determines the determinable characteristics by communication with the second user device over a peer-to-peer network.

26. The apparatus of claim 25,
  wherein the processor is further configured to determine whether or not the initial trust level permits log sharing with the second user device, and
  wherein the transceiver is further configured to send initial log data of the first user device to the second user device based on the initial trust level permitting log sharing with the second user device.

27. The apparatus of claim 26,
  wherein the processor is further configured to determine whether or not the first trust level permits additional log sharing with the second user device; and
  wherein the transceiver is further configured to send additional log data to the second user device based on the first trust level permitting additional log sharing with the second user device, wherein the additional log data has a higher privacy level than the initial log data.

28. The apparatus of claim 19, wherein the first period of time and the second period of time comprise a same period of time.

29. An apparatus for incrementally sharing increasing amounts of information between two or more user devices, comprising:
  means for detecting a second user device that is proximate a first user device;
  means for receiving first log data having a first privacy level from the second user device, wherein the first log data comprises log data of the second user device over a first period of time;
  means for determining whether the first user device and the second user device interacted with each other during the first period of time based on the first log data;
  means for assigning a first trust level to the second user device based on the first user device and the second user device having interacted with each other during the first period of time, the first trust level corresponding to a second privacy level of information to be shared with the second user device;
  means for receiving second log data having the second privacy level from the second user device, wherein the second log data comprises log data of the second user device over a second period of time, and wherein the second privacy level is higher than the first privacy level;
  means for determining whether the first user device and the second user device interacted with each other during the second period of time based on the second log data; and
  means for assigning a second trust level to the second user device based on the first user device and the second user device having interacted with each other during the second period of time.

30. A non-transitory computer-readable medium for incrementally sharing increasing amounts of information between two or more user devices, comprising:
  at least one instruction for detecting a second user device that is proximate a first user device;
  at least one instruction for receiving first log data having a first privacy level from the second user device, wherein the first log data comprises log data of the second user device over a first period of time;
  at least one instruction for determining whether the first user device and the second user device interacted with each other during the first period of time based on the first log data;
  at least one instruction for assigning a first trust level to the second user device based on the first user device and the second user device having interacted with each other during the first period of time, the first trust level corresponding to a second privacy level of information to be shared with the second user device;
  at least one instruction for receiving second log data having the second privacy level from the second user device, wherein the second log data comprises log data of the second user device over a second period of time, and wherein the second privacy level is higher than the first privacy level;
  at least one instruction for determining whether the first user device and the second user device interacted with each other during the second period of time based on the second log data; and
  at least one instruction for assigning a second trust level to the second user device based on the first user device and the second user device having interacted with each other during the second period of time.

* * * * *